(12) United States Patent
Deshi

(10) Patent No.: US 7,804,043 B2
(45) Date of Patent: Sep. 28, 2010

(54) METHOD AND APPARATUS FOR DICING OF THIN AND ULTRA THIN SEMICONDUCTOR WAFER USING ULTRAFAST PULSE LASER

(75) Inventor: Tan Deshi, Wuhan (CN)

(73) Assignee: Laserfacturing Inc., Burlington, Ontario (CA)

( * ) Notice: Subject to any disclaimer, the term of this patent is extended or adjusted under 35 U.S.C. 154(b) by 1229 days.

(21) Appl. No.: 11/048,705

(22) Filed: Feb. 3, 2005

(65) Prior Publication Data

US 2005/0274702 A1    Dec. 15, 2005

Related U.S. Application Data

(60) Provisional application No. 60/579,238, filed on Jun. 15, 2004.

(51) Int. Cl.
B23K 26/14    (2006.01)
B23K 26/16    (2006.01)

(52) U.S. Cl. .................. 219/121.67; 219/121.68; 219/121.72; 219/121.69

(58) Field of Classification Search ............ 219/121.67, 219/121.68, 121.72, 121.69
See application file for complete search history.

(56) References Cited

U.S. PATENT DOCUMENTS

| | | | | |
|---|---|---|---|---|
| 3,740,117 | A | * | 6/1973 | Hubby, Jr. .................. 359/308 |
| 3,912,391 | A | * | 10/1975 | Fleisher et al. ................ 355/54 |
| 4,688,540 | A | | 8/1987 | Ono |
| 4,885,734 | A | * | 12/1989 | Yuzo ....................... 369/44.23 |
| 6,156,030 | A | * | 12/2000 | Neev .......................... 606/10 |
| 6,216,682 | B1 | | 4/2001 | Nambu et al. |
| 6,277,001 | B1 | | 8/2001 | Saito |
| 6,285,002 | B1 | * | 9/2001 | Ngoi et al. ............ 219/121.73 |
| 6,344,402 | B1 | | 2/2002 | Sekiya |
| 6,361,404 | B1 | | 3/2002 | Ishiwata et al. |
| 6,465,158 | B1 | | 10/2002 | Sekiya |
| 6,500,047 | B2 | | 12/2002 | Arai et al. |
| 6,528,864 | B1 | | 3/2003 | Arai |
| 6,574,250 | B2 | * | 6/2003 | Sun et al. ...................... 372/25 |
| 6,621,040 | B1 | * | 9/2003 | Perry et al. ............ 219/121.67 |
| 6,676,491 | B2 | | 1/2004 | Arai et al. |
| 6,676,878 | B2 | | 1/2004 | O'Brien et al. |
| 6,677,552 | B1 | | 1/2004 | Tulloch et al. |
| 6,693,660 | B2 | * | 2/2004 | Hemmings .................. 347/252 |
| 6,714,289 | B2 | | 3/2004 | Haraguchi et al. |
| 6,720,519 | B2 | | 4/2004 | Liu et al. |
| 6,727,458 | B2 | | 4/2004 | Smart |
| 2002/0005396 | A1 | * | 1/2002 | Baird et al. ............ 219/121.68 |

(Continued)

*Primary Examiner*—M. Alexandra Elve
(74) *Attorney, Agent, or Firm*—Greenblum & Bernstein P.L.C.

(57) ABSTRACT

The present invention relates to the apparatus, system and method for dicing of semiconductor wafers using an ultrafast laser pulse of femtosecond and picosecond pulse widths directly from the ultrafast laser oscillator without an amplifier. Thin and ultrathin semiconductor wafers below 250 micrometer thickness, are diced using diode pumped, solid state mode locked ultrafast laser pulses from oscillator without amplification. The invention disclosed has means to avoid/reduce the cumulative heating effect and to avoid machine quality degrading in multi shot ablation. Also the disclosed invention provides means to change the polarization state of the laser beam to reduce the focused spot size, and improve the machining efficiency and quality. The disclosed invention provides a cost effective and stable system for high volume manufacturing applications. An ultrafast laser oscillator can be a called as femtosecond laser oscillator or a picosecond laser oscillator depending on the pulse width of the laser beam generated.

49 Claims, 14 Drawing Sheets

U.S. PATENT DOCUMENTS

2002/0153362 A1* 10/2002 Sandstrom et al. ..... 219/121.73
2003/0189959 A1* 10/2003 Erbert et al. ................. 372/25
2004/0155017 A1* 8/2004 Hunt et al. ............. 219/121.69
2005/0218122 A1* 10/2005 Yamamoto et al. ..... 219/121.61

* cited by examiner

Cross section CC

METHOD AND APPARATUS FOR DICING OF THIN AND ULTRA THIN SEMICONDUCTOR WAFER USING ULTRAFAST PULSE LASER

This Nonprovisional application claims priority under 35 U.S.C. §119(e) on U.S. Provisional Application No. 60/579,238 filed on Jun. 15, 2004, the entire contents of which is hereby incorporated by reference.

BACKGROUND OF THE INVENTION

1. Field of the Invention

The present invention relates to a method and apparatus for dicing of thin and ultra thin semiconductor wafers using ultrafast pulse laser, and more specifically it relates to an apparatus and method for dicing using ultrafast pulse laser directly from an oscillator without an amplifier, operating in picosecond and femtosecond pulse width modes.

2. Description of the Related Art

Dicing of Thin and Ultra Thin Silicon Wafer

The semiconductor industry is moving towards thin silicon in various fields. The bulk of the silicon plays no role in the performance of the circuit, and hence the semiconductor industry is moving toward thin silicon. The reasons include a desire to increase the density of the integrated circuit by stacking the circuit; to conduct heat away from the active area by moving the device closer to the metal heat sink by reducing the thickness of silicon; and to use smart cards and other applications that need thin silicon wafers.

Traditionally a saw blade such as a diamond saw is used for silicon wafer dicing. But as the thickness of the wafer decreases below 100 micrometer, saw dicing leads to chipping and breaking of the dies. Also the dicing speed reduces as thickness of the silicon wafer reduces in the case of saw dicing. Alternatively the silicon is diced by saw and ground to the desired thickness, but this process leads to severe backside chipping during the grinding process.

Concerns about ultra-thin IC packaging dicing include wafer breakage. Even a small force will cause breakage, the worst case in semiconductor manufacturing. Below the thickness of 50 μm contact dicing method is not feasible due to wafer breakage. Water is extreme harmful, and round corners are required to enhance the die strength Saw Blade Dicing Traditionally a saw blade such as a diamond saw is used for silicon wafer dicing as disclosed in U.S. Pat. Nos. 6,277,001, 6,361,404, 6,676,491, 6,500,047, 6,465,158, and 6,528,864. But as the thickness of the wafer decreases below 100 micrometer, saw dicing leads to chipping and breaking of the dies. Also the dicing speed reduces as thickness of the silicon wafer reduces in case of dicing saw. Alternatively the silicon is diced by saw and grinded to the desired thickness, but this process leads to severe backside chipping during grinding process.

Nanosecond Laser (Nd—Yag) Dicing

In order to overcome the problem associated with a saw for thin silicon dicing, a diode pumped solid state Nd—Yag laser of nanosecond pulse width has been used (U.S. Pat. No. 6,676,878). A long pulse laser increases the dicing speed and reduces the dicing kerf width, but it has limitations due to long pulse width (nanosecond pulse width).

The advantages of this technique include a reduced kerf width, typical kerf=25 μm, a high speed at thin wafer thickness, and round corners are possible.

The problems of this technique include chipping and micro cracks. Moreover, the heat affected zone alters the property of the materials in the vicinity of the machined surface resulting in reduced material strength and hence the die strength. There is also damage to the surrounding circuit because of heat diffusion. There is debris due to spattered molten material. There is water usage which is unavoidable since post dicing washing is needed. There are recast deposits on the sidewall, which is vital for semiconductor application. This is also low die strength due to heat diffusion Dicing of Low-K Dielectric Semiconductor Wafer The conventional silicon dioxide dielectrics are inadequate for the future needs. Better performing ICs mandates the introduction of several new materials into the device structure, including interlayer dielectrics with low dielectric constant. These low-K dielectrics are insulating materials that are specially designed to reduce the capacitance between the copper lines on the chip. An insulator with a low dielectric constant, than the value of 4.2-4.5 for silicon dioxide is required primarily for the realization of the full benefit of the copper dual-damascene technology. The dielectric constant value of the insulating material decreases with the reduction in the node width. The fragility and poor adhesion of low-K dielectric cause serious difficulty in dicing of these layers, restraining manufacturers from introducing low-K dielectrics into their product lines. Also advanced package such as wafer scale or wafer level packaging which consist of a thick polymer layer on top of silicon substrate. When dicing saw is used for dicing wafers with low-K dielectric, large tensile and shear stress are imparted at the cut zone which leads to significant cracking and adhesion loss leading to delamination and chipping of the metal and low-k layers. In order to eliminate this problem diode pump solid state laser of wavelength ranging from 1100 to 250 nm of 1-100 nanosecond pulse width was used for pre scribing the low-k dielectric and metal layer before dicing using a saw blade. Due to long laser pulse width and low absorbability of the low-k dielectric layer, laser scribing using long pulse width laser (more than 100 pico second) leads to delamination and chipping. Although the delaminating and chipping reduces with the reduction in the wavelength of the long pulse laser (more than 100 ps), but these problem cannot be completely eliminated over the entire dicing lane or wafer. As the nod size reduces and hence the low-k dielectric constant value reduces, it is easy to chip and delaminate when long pulse laser is used for scribing.

Some of the drawbacks, associated with the dicing of low-K dielectric semiconductor using nanosecond laser and saw, include two steps (laser scribing followed by saw dicing), and positioning error occurs when aligning saw to laser scribed lane. Other drawbacks include chipping, delamination and debris.

Ultrafast Laser Processing

Amplified short pulse laser of pulse width 100 picosecond to 10 femtosecond are being used in general applications to overcome the problem of long pulse laser. One a advantage of short pulse lasers in comparison to long pulse laser includes the energy does not have the time to diffuse away and hence there is minimal or no heat affected zone and micro cracks, since the duration of short pulse laser is shorter than the heat dissipation time. There is also negligible thermal conduction beyond the ablated region resulting in negligible stress or shock to surrounding material. Since there is minimal or no melt phase in short pulse laser processing, there is no splattering of material onto the surrounding surface. There is no damage caused to the adjacent structure since no heat is transferred to the surrounding material. There are no undesirable changes in electrical or physical characteristic of the material surrounding the target material. There is no recast layer present along the laser cut side walls, which is vital for semiconductor application. Ultrafast laser processing eliminates the need for any ancillary techniques to remove the recast material within the kerf or on the surface. The surface debris present does not bond with the substrate and are easy to remove with conventional washing techniques. Machined feature size can be significantly smaller than the focused laser spot size of the laser beam and hence the feature size is not limited by the laser wavelength.

Short pulse laser can be broadly divided in to two categories. The first is femtosecond pulse width laser (ranging from 10 fs-1 ps), and the second is pico second pulse width laser (ranging from 1 ps-100 ps).

The femtosecond laser system (which is generally a Ti-sapphire laser) generally consist of a mode locked femtosecond oscillator module, which generates and delivers femtosecond laser pulse of in the order of nanojoule pulse energy and 10-200 MHz repletion rate. The low energy pulse is stretched in time prior to amplification. Generally the pulse is stretched to Pico second pulse width in a pulse stretcher module, using a dispersive optical device such as a grating. The resultant stretched beam is then amplified by several orders of magnitude in the amplifier module, which is commonly called as regenerative amplifier or optical parameter amplifier (OPA). The pump lasers generally used to pump the gain medium in the amplifier are Q-switched Neodymium—yttrium—lithium—floride (Nd—YLF) laser or Nd: YAG laser with the help of diode pump laser or flash lamp type pumping. The repletion rate of the system is determined by the repletion rate of the pump laser. Alternatively if continuous pumping is used, then the repetition rate of the system is determined by the optical switching within the regenerative amplifier. The resultant amplified laser pulse is of Ps pulse width is compressed to femtosecond pulse width in a compressor module. By this means femtosecond pulse of mille joules to micro joules of pulse energy of repletion rate 300 KHz to 500 Hz and average power less than 5W are produced.

The amplified femtosecond pulse has been used widely for micro machining applications such as U.S. Pat. Nos. 6,720, 519, 6,621,040, 6,727,458 and 6,677,552. However, it suffers from several limitations, which prevents it from being employed in high volume manufacturing industrial applications. The system is very unstable in terms of laser power and laser pointing stability. Laser stability is very essential in obtaining uniform machining quality (Ablated feature size) over the entire scan field. The average laser power is too low to meet the industrial throughput. The Amplified femtosecond laser technology is very expensive, which will increase the manufacturing cost considerably. The down time of the system is high to the complexity of the laser system. There is a large floor space required for the laser system. There is relatively poor feature size and depth controllability due to laser power fluctuation. Experienced and trained professionals are required for the maintenance of the system.

In contrast, an amplified pico second laser system comprised of a pico second oscillator, which delivers picosecond laser of nanojoules pulse energy, is amplified by a amplifier. The pump lasers generally used to pump the gain medium in the amplifier are Q-switched Neodynium—yttrium—lithium—floride (Nd—YLF) laser or Nd: YAG laser with the help of diode pump laser or flash lamp type pumping. The repletion rate of the system is determined by the repletion rate of the pump laser. Alternatively, if continuous pumping is used then the repetition rate of the system is determined by the optical switching within the regenerative amplifier. The resultant amplified pulse has a repletion rate ranging from 500 Hz to 300 KHz of average power 1 to 10 W.

An amplified picosecond laser is simple and compact in comparison to an amplified femtosecond laser, but it has limitations. The amplified picosecond laser is also more stable than an amplified femtosecond laser system, and it is still unstable in terms of laser power and laser pointing stability to meet the needs for industrial high volume manufacturing applications. Laser stability is very essential in obtaining uniform machining quality (ablated feature size) over the entire scan field. The amplified picosecond femtosecond laser technology also is cheaper than amplified femtosecond laser system, but it is still expensive, which will increase the manufacturing cost considerably. There is relatively poor feature size and depth controllability due to laser power fluctuation. The down time of the system is high. Large floor space for the laser system is needed. Experienced and trained professionals are required for the maintenance of the system Femtosecond laser with very low fluency is a promising machining tool for direct ablating of sub-micron structures. Fundamental pulses emitting from oscillator can be used to create nano-features. But due to short time gap between the successive pulses, there is a considerable degrade in the machining quality, which may be explained as below.

At the end of the irradiation of an individual laser pulse, surface temperature rises to $T_{max}$. Due to thermal diffusion, the surface temperature decays slowly and eventually reduces to the environment temperature $T_0$. The time span of the thermal diffusion $\tau_{diffusion}$ can be determined by the one-dimensional homogeneous thermal diffusion equation. In the case of multi-shot ablation, if the successive pulse arrives before $\tau_{diffusion}$ ($t<\tau_{diffusion}$), the uncompleted heat dissipation will enhance the environment temperature. The environment temperature after n laser shots for a pulse separation of t at a time just before the next (or (n+1)th) shot can be expressed by $T_0(n)=T_0+n\delta T$, where, $\delta T$ is the temperature rise due to un-dissipated heat at the end of a pulse temporal separation.

The actual surface temperature $T_{max}(n)$ after n successive pulses can be written as $$T_{max}(n)=T_0(n)+T_{max}$$

The enhanced surface temperature of the ablation front will cause over heating and deteriorate the quality of ablation. In the case of via drilling application, such over heating deteriorate the geometry of via, causing barrel at the bottom of the hole.

The longer the time between successive pulses, the less is the effect of the thermal coupling enhancing the surface temperature. When pulse separation t is long enough that the heat diffusion outranges the thermal coupling, the machining quality of multi-shot ablation will be as good as that of single-shot ablation.

In fact, thermal coupling effect of multi-shot ablation was observed not only for nano-second pulses but also for ultrafast laser pulses. Fuerbach, reported that to avoid degrading of machine precision due to heat accumulating 1 μs pulse separation should be given for femtosecond pulses ablation of glass.

SUMMARY

The object of the present invention is to provide an improved method and apparatus for dicing of thin and ultrathin semiconductor wafers and to ameliorate the aforesaid deficiencies of the prior art by using an ultrafast pulse generated directly from the laser oscillator. The laser oscillator includes a mode locked diode pumped solid state laser system, which is stable and compact. The pulse laser beam having a pulse width of 1 fs to 100 ps and repletion rate from 1 MHz to 400 MHz is controlled by an electro optic modulator or an acousto optic modulator. Alternatively, an amplified ultrafast laser source is used for dicing semiconductor wafer of a thickness above 80 micrometer.

The modulated pulse is expanded to required beam diameter by using a combination of positive and negative lens to act as a telescope. Varying the diameter of the laser beam, the focused laser spot size can be varied. The pulsed laser beam scanned by a 2-axis galvanometer scanner to scan the pulse laser beam on the surface of the work piece in a predetermined pattern. The scanning beam can be focused on a work piece using a focusing unit or lens, which is preferably a scanning lens, telecentic lens, F-θ lens, or a the like, positioned a distance from the scanning mirror approximately equal to the front focal length (forward working distance) of the focusing lens. The work piece is preferably positioned at approximately the back focal length (back working distance) of the focusing lens.

In another aspect of the invention, the modulator controls the laser pulse to minimize the cumulative heating effect and to improve the machining quality. In addition to pulse control the modulator controls the pulse energy and function as a shutter to on and off the laser pulse when required.

In another aspect of the invention, the cumulative heating effect can be minimized or eliminated by using a gas or liquid assist. Due to the cooling effect of the assisted gas or liquid it is possible to minimize the cumulative heating effect even at high repletion rate. Also the machining quality and efficiency of processing is improved on using assisted gas or liquid.

In another aspect of the invention, the cumulative heating effect, quality of the machined feature and efficiency of the process also depends on the scanning speed of the laser. The scanning speed is controlled depending on the repletion rate of the laser beam, the ablated feature size and the type of gas or liquid assist used.

In another aspect of the present invention, a polarization conversion module is used to vary the polarization state of the laser beam along the axis. The modules uses a combination of a telescopic arrangement with a retardation plate or birefrengent material in-between them. The resultant polarization state of the beam can be partially or fully radial polarization state. This enables reduced focused spot size and improvement in the cutting efficiency and quality compared to linear and circularly polarized laser beam.

In another aspect of the present invention a piezo scanner is used for scanning the laser beam in 2 axes rather than a galvanometer scanner. This eliminates the distortion created at the image field due to common pivot point of scanning on two axes. Also the position accuracy and resolution is enhanced.

In another aspect of the present invention a beam shaping module is introduced to change the profile of the laser beam to desired profile using a combination of a MDT element and a quarter wave plate. By carefully selecting the beam diameter and the length of the MDT element the beam profile is varied for semiconductor dicing application.

In another aspect of the present invention, the pulse energy plays a vital role in micro and nano processing with high quality. The pulse energy required to ablate a feature depends on the depth of ablation, repeatability of feature size required and the feature quality. The maximum depth that can be generated for a given focused spot size of the laser beam depends on the pulse energy. As the ablated feature becomes deeper it is difficult to remove the ablated material from the hole and hence the ablated material absorbs the energy of the subsequent pulse. Also the uncertainty in the feature size obtained will depend on the number of pulse required to ablate the required feature. Due to the topography generated and debris deposited in the crater by the ablation of the first pulse the absorption of the successive pulse is different due to the defects generated in the previous pulse, scattering of the laser beam etc. Due to the above mechanism the ablation threshold of the successive pulse may be vary. The uncertainty in the diameter of the ablated feature increases with increase in the number of pulses. Also, higher pulse energy generates sufficient pressure for ejecting the debris out of the carter and hence the successive pulse will interact with the fresh substrate. This results in improved top surface and inner wall quality of the ablated feature. Hence it is advantageous to higher pulse energy and lower number of pulse to ablate a required feature.

In another aspect of the invention, the effect of wavelength on the cutting efficiency and stability of micron and nano processing using laser pulse from ultrafast laser oscillator is disclosed. In ultrafast laser processing the wavelength of the laser beam does not have a major impact on the threshold fluence of the material as in case of short pulse ablation in micron and nanosecond pulse width. Due to high peak power of the laser due to short pulse width, the protons are generated by the laser beam to start the ablation process rather than generated from the substrate. Hence absorption of the material at different wavelength does not have a major influence in its threshold fluence. Hence laser beam having the fundamental frequency will have higher cutting efficiency than the second harmonic frequency for a given focused spot size due to the higher average power from the ultrafast laser oscillator at fundamental laser frequency. Similarly, the laser beam having the second harmonic frequency will have higher cutting efficiency compared to third harmonic frequency due to the greater average power from the ultrafast laser oscillator at second harmonic frequency. Also the stability of the laser beam will deteriorate with the reduction in wave length by frequency doubling and tripling, due to increase in the optical components and the sensitivity of the frequency doubling and tripling crystal to environmental factors such as temperature. Hence repeatability in feature size and position accuracy may deteriorate compared to the fundamental frequency from the ultrafast laser oscillator by frequency doubling and tripling. Also the cost of the system may increase by frequency doubling and tripling due to addition of more optical components. In spite of the drawbacks of using frequency doubled and tripled laser pulse, some applications may demand the use of shorter wavelength to achieve smaller feature size and in sensitive material processing.

In addition the method and apparatus of the present invention can be utilized for dicing/singulation of thin semiconductor wafers less than 150 micron thickness using ultrafast pulse generated directly from the laser oscillator. Alternatively ultrafast laser source and an amplifier can be used for dicing semiconductor wafer thicker than 80 micrometer. A small quantity of substrate material is removed along dicing/singulation lane forming a shallow channel along the dicing/singulation lane. The thickness of material removed in each cycle can be in the range of few microns to few nanometers and the entire cut will be performed by multiple cycles. The number of cycle of repeated scanning may be required depending on the thickness of the semiconductor wafer.

BRIEF DESCRIPTION OF THE DRAWING

FIG. 16A is an illustration showing the layer by layer removal of material of laser diced channel in the dicing/singulation lane in a thin semiconductor wafer using laser from ultrafast laser oscillator.

FIG. 16B is an illustration showing the cross-section of the finished laser diced channel in the dicing/singulation lane in a thin semiconductor wafer using laser from ultrafast laser oscillator.

DETAILED DESCRIPTION OF THE INVENTION

Figure 1:
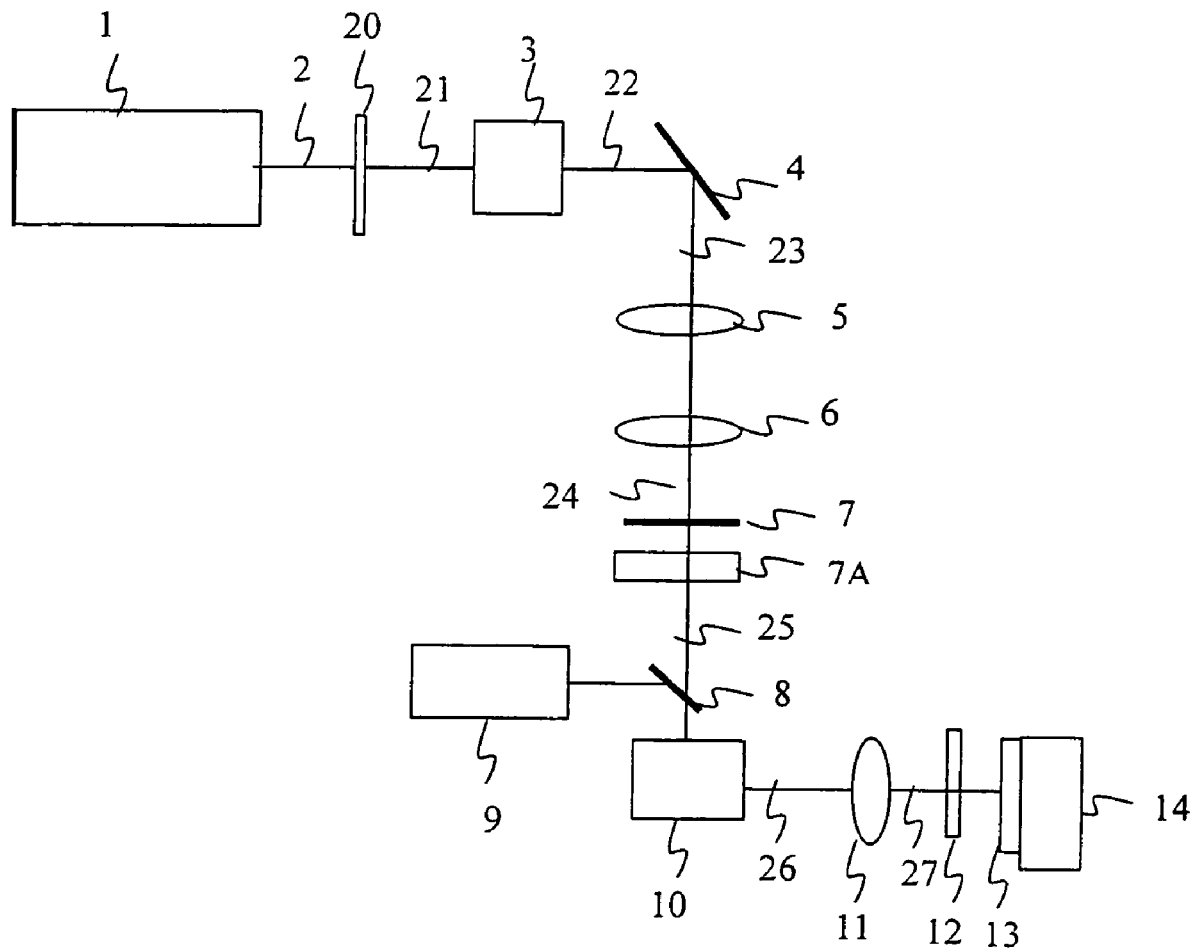
FIG. 1 is an illustration showing the laser apparatus for micro and nano processing using ultrafast laser pulse from the oscillator.

The object of the present invention is to provide an improved method and apparatus for dicing of thin and ultrathin semiconductor wafer and to ameliorate the aforesaid deficiencies of the prior art by using ultrafast pulse generated directly from the laser oscillator. The laser oscillators are mode locked diode pumped solid state laser system, which is stable and compact. The pulse laser beam having a pulse width of 1 fs to 100 ps of repletion rate from 1 MHz to 400 MHz is controlled by an electro optic modulator or acousto optic modulator. Alternatively, an amplified ultrafast laser source is used for dicing a semiconductor wafer of a thickness above 80 micrometer.

The modulated pulse is expanded to a required beam diameter by using a combination of positive and negative lens to act as a telescope. Varying the diameter of the laser beam, the focused laser spot size can be varied. The pulsed laser beam is scanned by a two axis galvanometer scanner to scan the pulse laser beam on the surface of the work piece in a predetermined pattern. The scanning beam can be focused on a work piece using a focusing unit or lens, which is preferably a scanning lens, telecentic lens, F-θ lens, or the like, positioned a distance from the scanning minor approximately equal to the front focal length (forward working distance) of the focusing lens. The work piece is preferably positioned at approximately the back focal length (back working distance) of the focusing lens.

In another aspect of the invention, the modulator controls the laser pulse to minimize the cumulative heating effect and to improve the machining quality. In addition to pulse control, the modulator controls the pulse energy and function as a shutter to turn on and off the laser pulse when required.

In another aspect of the invention, the cumulative heating effect can be minimized or eliminated by using a gas or liquid assist. Due to the cooling effect of the assisted gas or liquid it is possible to minimize the cumulative heating effect even at high repletion rate. Also the machining quality and efficiency of processing is improved on using assisted gas or liquid.

In another aspect of the invention, the cumulative heating effect, quality of the machined feature and efficiency of the process also depends on the scanning speed of the laser. The scanning speed is controlled depending on the repletion rate of the laser beam, the ablated feature size and the type of gas or liquid assist used.

In another aspect of the present invention, the pulse energy plays a vital role in micro and nano processing with high quality. The pulse energy required to ablate a feature depends on the depth of ablation, repeatability of feature size required and the feature quality. The maximum depth that can be generated for a given focused spot size of the laser beam depends on the pulse energy. As the ablated feature becomes deeper it is difficult to remove the ablated material from the hole and hence the ablated material absorbs the energy of the subsequent pulse. Also the uncertainty in the feature size obtained will depend on the number of pulses required to ablate the required feature. Due to the topography generated and debris deposited in the crater by the ablation of the first pulse the absorption of the successive pulse is different due to the defects generated in the previous pulse, scattering of the laser beam etc. Due to the above mechanism, the ablation threshold of the successive pulse may vary. The uncertainty in the diameter of ablated feature increases with an increase in the number of pulses. Also, higher pulse energy generates sufficient pressure for ejecting the debris out of the carter and hence the successive pulse will interact with the fresh substrate. This results in improved top surface and inner wall quality of the ablated feature. Hence it is advantageous to have higher pulse energy and a lower number of pulses to ablate a required feature.

In another aspect of the present invention, a polarization conversion module is used to vary the polarization state of the laser beam along the axis. The modules uses a combination of a telescopic arrangement with a retardation plate or birefrengent material in-between them. The resultant polarization state of the beam can be partially or fully radial polarization state. This enables reduced focused spot size and improvement in the cutting efficiency and quality compared to linear and circularly polarized laser beam.

In another aspect of the present invention a piezo scanner is used for scanning the laser beam in 2 axes rather than a galvanometer scanner. This eliminates the distortion created at the image field due to common pivot point of scanning on two axes. Also the position accuracy and resolution is enhanced.

In another aspect of the present invention a beam shaping module is introduced to change the profile of the laser beam to desired profile using a combination of MDT element and quarter wave plate. By carefully selecting the beam diameter and the length of the MDT element the beam profile is varied for semiconductor dicing application.

In another aspect of the invention, the effect of wavelength on the cutting efficiency and stability of micron and nano processing using laser pulse from ultrafast laser oscillator is disclosed. In ultrafast laser processing the wavelength of the laser beam does not have a major impact on the threshold fluence of the material as in case of short pulse ablation in micron and nanosecond pulse width. Due to high peak power of the laser due to short pulse width, the protons are generated by the laser beam to start the ablation process rather than generated from the substrate. Hence absorption of the material at different wavelength does not have a major influence in its threshold fluence. Hence laser beam having the fundamental frequency will have higher cutting efficiency than the second harmonic frequency for a given focused spot size due to the higher average power from the ultrafast laser oscillator at fundamental laser frequency. Similarly, the laser beam having the second harmonic frequency will have higher cutting efficiency compared to third harmonic frequency due to the greater average power from the ultrafast laser oscillator at second harmonic frequency. Also the stability of the laser beam will deteriorate with the reduction in wave length by frequency doubling and tripling, due to increase in the optical components and the sensitivity of the frequency doubling and tripling crystal to environmental factors such as temperature. Hence repeatability in feature size and position accuracy may deteriorate compared to the fundamental frequency from the ultrafast laser oscillator by frequency doubling and tripling. Also the cost of the system may increase by frequency doubling and tripling due to addition of more optical components. In spite of the drawbacks of using frequency doubled and tripled laser pulse, some applications may demand the use of shorter wavelength to achieve smaller feature size and in sensitive material processing.

In addition the method and apparatus of the present invention can be utilized for dicing/singulation of thin semiconductor wafers less than 150 micron thickness using ultrafast pulse generated directly from the laser oscillator. Alternatively, ultrafast laser source and an amplifier can be used for dicing semiconductor wafer thicker than 80 micrometer. A small quantity of substrate material is removed along dicing/singulation lane forming a shallow channel along the dicing/singulation lane. The thickness of material removed in each cycle can be in the range of few microns to few nanometers and the entire cut will be performed by multiple cycles. The number of cycle of repeated scanning may be required depending on the thickness of the semiconductor wafer.

Exemplary embodiments of the present invention will now be described in greater detail in reference to the figures.

One embodiment of the present invention is the method and apparatus for micron and nano processing using ultrafast laser pulse directly from the laser oscillator. The ultrafast laser oscillator 1 generates laser pulse of pulse with 1 fs-100 ps. The laser pulse is preferably of the wavelength 1200-233 nm and repletion rate from 1 MHz to 400 MHz. Also the laser beam is collimated and of linear or circular polarization state. The laser beam 20 incidents substantially normally on a wave plate 2, which is preferably a half wave or quarter wave plate to change the polarization state of the incident laser beam 20. The laser pulse 21 is modulated by beam modulating means 3. The modulated laser pulse 22 is deflected by a mirror 4. The laser beam 23 is expanded or reduced in beam diameter by the optical lens 5 and 6, which are arranged and are of the type keplerian telescope (where optical lens 5 and 6 are positive lens) or Galilean telescope (where optical lens 5 is a negative lens and optical lens 6 is a positive lens for beam size expansion or vice versa for beam size reduction).

The expanded laser beam 24 is passed through a diaphragm 7 to cut the edge of the Gaussian beam and to improve the quality of the pulsed laser beam. The laser beam passes through a polarization conversion module 7A to alter the polarization state of the laser beam. The laser beam 25 is then scanned in X and Y axis by a two axis galvanometer scanner or a piezo scanner 10 after passing through a mirror or polarizer 8. Camera 9 images the work piece through 8, to align the work piece to the laser beam and to monitor the machining process. The laser beam 26 from the galvanometer or a piezo scanner 10 is focused by an optical lens 11, which is preferably a telecentric lens or f-theta lens or scan lens or confocal microscopy lens. The lens 11 is positioned at the forward working distance from the center of the two scanning mirrors in the case of a galvanometer scanner 10. The work piece/substrate 13 is placed at a distance equal to the back working distance of the lens 11 from the back face/out put of the lens 11. A gas assist system comprising of one or more nozzle is positioned close to the work piece/substrate 13. Preferably the work piece/substrate 13 is placed on a three axis mechanical translational stage 14. The translational stage 14 translates with respect to the laser beam 27 during and after laser dicing of an area defined by a field of view of the scanning lens.

During the micro and nano processing using ultrafast laser pulse directly from oscillator, the laser beam 27 may be focused on the top surface of the substrate/wafer 13 or located inside the bulk of substrate material between the top and bottom surface of the substrate 13. The location of the focus of the beam 27 depends on the thickness of the substrate/wafer 13. Thicker the material the focus of the laser beam 27 is further inside the bulk of the substrate, away from the top surface of the substrate.

Depending on the pulse energy of the laser beam 27 from the ultrafast laser oscillator 1 and the thickness of the substrate/wafer 13, the laser beam 23 is expanded or reduced, thus varying the energy density of the laser beam at the focused spot. When the laser beam 23 is expanded in beam diameter, using combination of optical lens 5 and 6, the focused spot size reduces and hence increases the energy density at the focused laser spot. Alternatively, when the laser beam 23 is reduced in beam diameter, using the combination of optical lens 5 and 6, the focused spot size increases and hence reducing the energy density at the focused laser spot.

The laser oscillator 1 generates laser pulse of pulse width 1 fs to 100 ps and pulse repletion rate from 1 MHz to 400 MHz. The fundamental wavelength of the laser beam ranges from 1200 nm to 700 nm, second harmonic wavelength 600 nm-350 nm and third harmonics from 400 nm to 233 nm. The pulse energy generated from this oscillator depends on the repetition rate of the system, higher the repletion rate lower will be the pulse energy and vice versa. Also the means of pumping determines the average output power. Generally the average power of the laser from the oscillator will be 0.2W-30W depending on the pulse width and wavelength of the laser. Laser with pulse width 1 fs to 200 fs have an average power of 0.2W to 10W depending on the pump laser power. Some of the commercially available femtosecond mode locked CW pumped solid state oscillators are Coherent Vitesse, Coherent Chameleon, Femtosource Scientific XL, Spectra Physics Mai-Tai etc. But the energy is not sufficient enough to achieve the throughput demanded by industries. Diode pumped solid state ultrafast laser generally produce higher average power in the range of 10-200W and has sufficient pulse energy and average power for high throughput dicing of thin semiconductor wafer. Some of the commercially available picosecond and femtosecond mode locked diode pump solid state oscillators are Coherent Paladin, Time Bandwidth Cheetah-X, Time Bandwidth Cougar, Lumera Laser UPL-20, Time Bandwidth Fortis etc.

Since the oscillator worked on diode pumped solid state technology and involve minimal optical components the system is highly stable for industrial high volume manufacturing applications. In ultrafast laser processing, the ablated feature size/machined feature size depends on the energy stability/noise of the laser. Based on Gaussian profile, for every 1% fluctuation in the laser fluence/laser energy there will be 16% fluctuation in the ablated/machined feature size in ultrafast laser processing. But most industrial application demand for strict feature size control within 1-5%. Also pointing stability becomes a very critical issue for machining feature in micron and nano scale industrial application. This stringent industrial requirement can be only be met by using laser pulse directly from ultrafast laser oscillator.

Hence, using laser pulse directly from ultrafast laser oscillator for micro/nano processing makes the ultrafast laser technology viable for high volume manufacturing industrial applications due to several reasons. The system is stable in terms of laser power and pulse to pulse energy due to Diode Pump Solid State (DPSS) laser technology and minimal optical components. The laser stability and the pulse to pulse energy stability and very critical in controlling and obtaining repeatability in ablated feature size. Good laser pointing stability is possible due to DPSS laser technology. There is good beam quality, which is essential for micro/nano processing. The laser power is high enough to meet the industrial throughput in micro/nano processing applications. The system is simple and cost effective and reduces the manufacturing cost considerably. There is low cost of ownership due to efficient DPSS technology. The down time of the system is very low. Very small floor space is needed for the laser system In spite of the salient features mentioned above, laser dicing of thin semiconductor wafer by using laser pulse directly from ultrafast laser oscillators limited due to the cumulative heating effect which results in poor machining quality. There is an absence of shutter mechanism to turn on and off the laser at high speed. There is an absence of means to control the pulse energy.

To avoid surface modification around the structure which one actually wants to generate, thermal diffusion of the heat out of the focal volume must overcome the deposited\laser energy. In this case there is no temperature rise around the focal area and hence no cumulative heating effect is expected. Thus in order to minimize the cumulative heating effect in multi short ablation the pulse separation time t should be long enough that the heat diffusion outranges the thermal coupling. There are different ways to minimize the cumulative heating effect and to improving machining quality disclosed in this invention, and they include controlling the laser pulse from the ultrafast laser oscillator, using gas assisted ablation, and scanning the laser beam at a rate at which the each laser pulse irradiates at different spot.

This ensures that the machining precision after many laser shots does not degrade in comparison to single pulse damage spot.

Controlling the Laser Pulse from the Ultrafast Laser Oscillator

Alternatively, the repetition rate can be reduced by increasing the resonator length and hence repletion rate as low as 5 MHz-10 MHz can be realized by increasing the resonator length. By reducing the pulse repetition rate the pulse energy can be increased, which increases the range of material that can be ablated and the feature size. The pulse energy, out of the mode locked oscillator can be calculated by $E_p = P_A/R$, where $E_p$ is the pulse energy, $P_A$ is the average power and R, repetition rate of the system.

But to completely eliminate the cumulative heating effect and to improve the ablated feature quality the repletion rate should be reduced to less than 1 MHz, which means a resonator cavity length of 150m, which is hard to realize. In order to further reduce the repletion rate some external pulse control means should be used. Also the pulse control means eliminates the need for shutter and pulse energy control mechanism.

Two type of pulse control means, namely electro optic and acousto optic modulation system, are disclosed in this invention to perform various functions. These functions include control of the repletion rate, control of the pulse energy, and operating as a laser shutter to turn on and off the laser out put when required.

Controlling the Laser Pulse by Electro Optic Modulator

Depending on the application, electro optic modulator is called as pockels cells or Q-switch or pulse picker. The electro optic modulator is used in combination with a polarizing beam splitter or polarizer or prism for controlling the laser pulse. The electro optic modulator has the certain specifications for efficient pulse control. These specifications include a short rise time in the range of 20 ns to 10 ps, energy/power loss less than 10%, and a clear aperture diameter: 2-10 mm.

Figure 2:
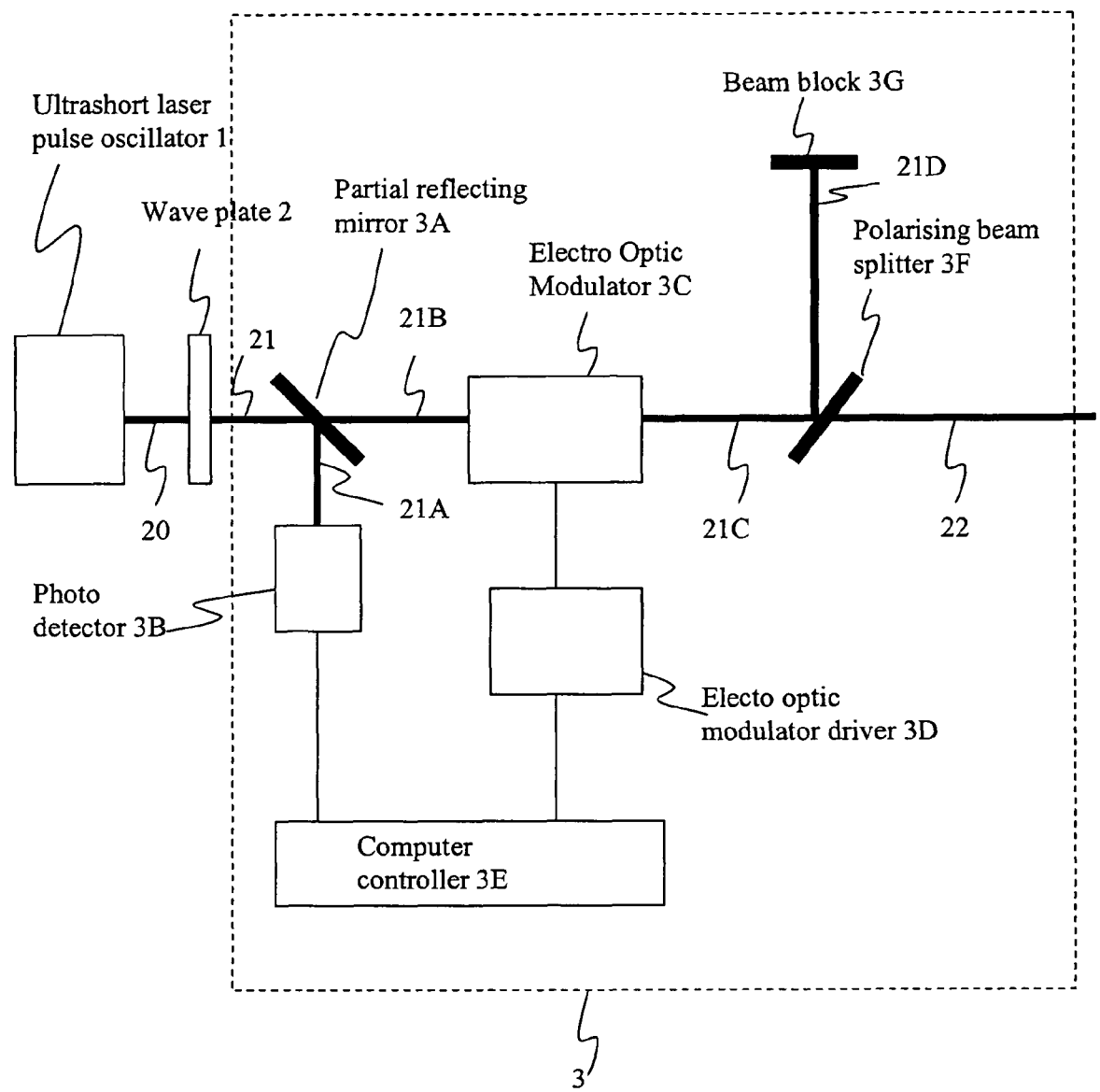
FIG. 2 is an illustration showing the apparatus to modulate the ultrafast laser pulse from the oscillator using electro optic modulator.

The antireflection coating and type of crystal in the modulator depend on the laser wavelength, which may vary depending on the application. The electro optic modulator is driven by a driver which can be computer controlled. On sending the trigger signal, which is preferably a voltage or power signal, to the electro optic modulator from the driver the polarization state of the laser beam is shifted from horizontal to vertical polarization or vice versa. Vertical and horizontal polarizations are also called as S and P polarizations. By changing the polarization the beam will be transmitted or deflected by the polarizing beam splitter or a polarizer or prism, thus acting like a high speed shutter and controlling the pulse. The deflected or transmitted beam can be used for processing but generally the transmitted beam is used for laser processing and the deflected beam is blocked by the beam blocking means. FIG. 2 shows the working mechanism of electro optic modulator for pulse control. The pulsed laser from the ultrafast laser oscillator 1, has a repletion rate of 5

Figure 3:
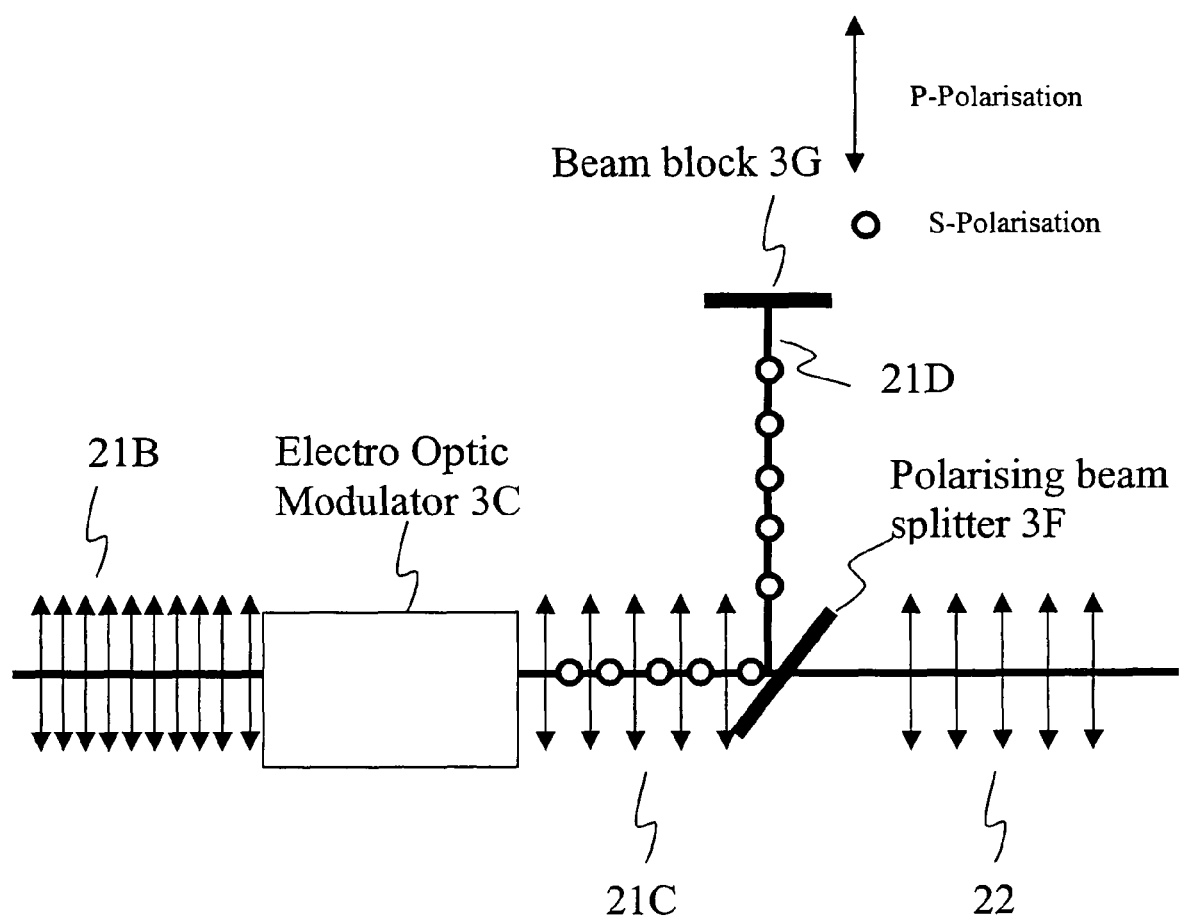
FIG. 3 is an illustration showing the mechanism of eliminating the successive ultrafast laser pulse to reduce the repetition rate by using electro optic modulator.
Figure 4:
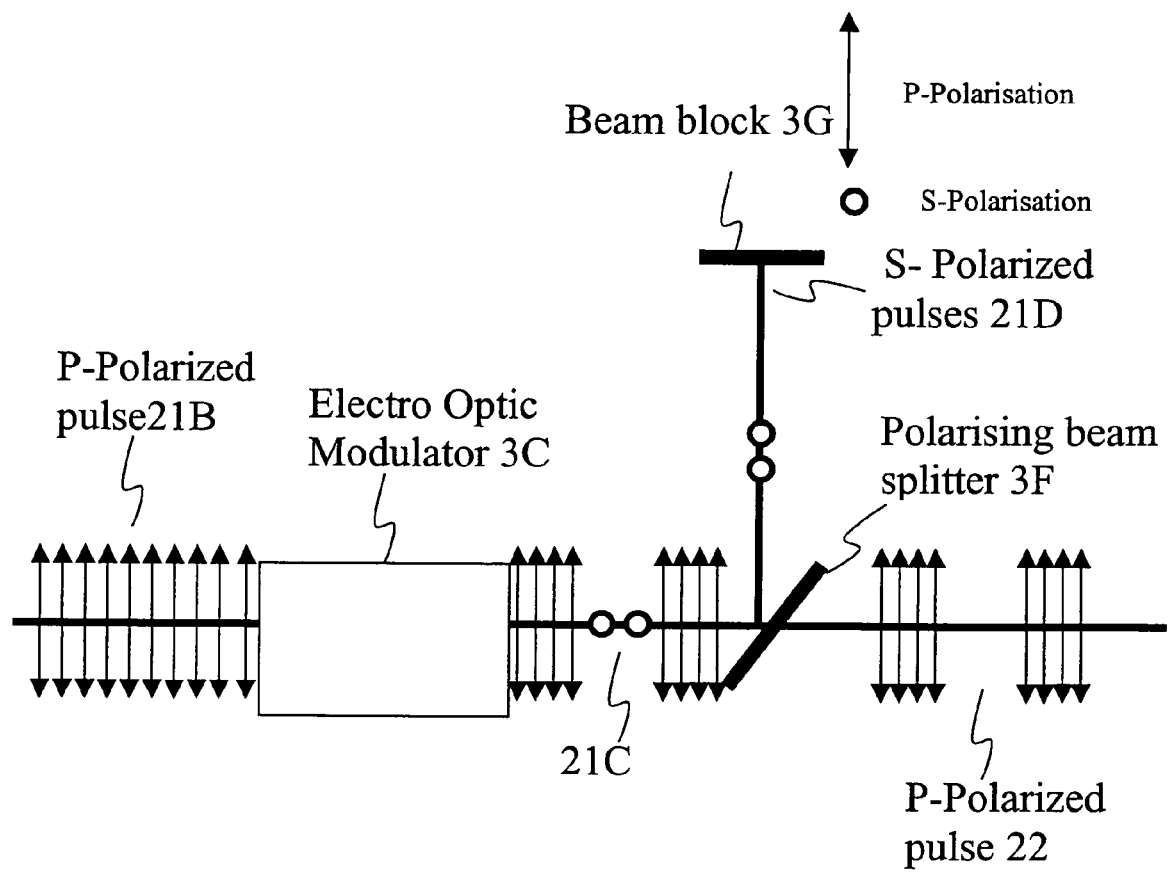
FIG. 4 is an illustration showing the introduction of a time gap between groups of laser pulse using electro optic modulator.
Figure 5:
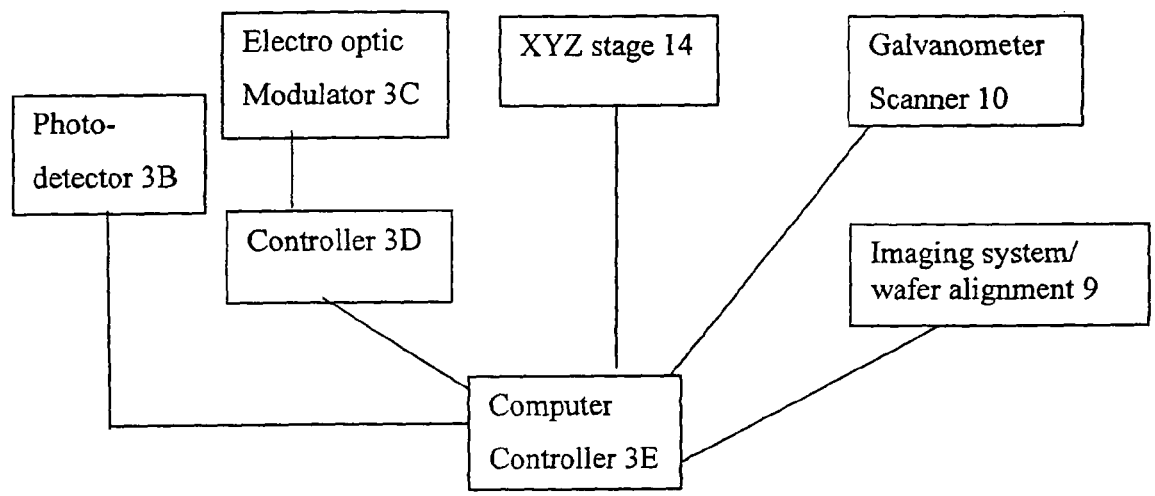
FIG. 5 is an illustration showing the control mechanism of photo detector, electro optic modulator, XYZ translation stage, galvanometer scanner and the imaging system by a processor control.

MHz to 200 MHz pass through an electro optic modulator 3C at S or P-polarization state. The electro optic modulator 3C is driven by a driver 3D, which is controlled by a computer 3E. A fraction of the laser beam 21 (less than 1% of energy) is deflected by a partial coated mirror 3A on to a photo detector 3B is placed before the electro optic modulator as shown in the FIG. 2 to obtain the signal from beam 21A and to synchronize the on/off of the electro optic modulator 3C to avoid any clipping of laser pulse 21C. Due to the fast rise time of the electro optic modulator 3C, the polarization state of any individual pulse or a group of pulse can be shifted by 90 degrees to S or P polarization state respectively. On passing through the polarizing beam splitter 3F which is of the type plate polarizing beam splitter or cube polarizing beam splitter or polarizer or prism, the S and P polarized laser pulse are deflected at different angle. One of the beams 21D can be blocked by a beam blocking means 3G and the other beam 22 can be used for laser processing. FIG. 3 shows the electro optic modulator changing the polarization state of alternative pulses and FIG. 4 shows the electro optic modulator changing the polarization state of group of pulse. Thus by using electro optic modulator 3C in combination with a polarizing beam splitter 3F for controlling the laser pulse from ultrafast laser oscillator, the repletion rate of the laser pulse can be reduced to any required value as shown in FIG. 3 to minimize/eliminate the cumulative heating effect and improve the machining quality. Alternatively a time gap is provided between groups of laser pulse to minimize the cumulative heating effect and improve the machining quality as sown in FIG. 4. Further the electro optic modulator serves as a shutter to on and off the ultrafast laser pulse when required. Further the electro optic modulator can be used to vary the pulse energy by varying the voltage applied to the electro optic modulator from the driver. Precise control of pulse energy/intensity control is very essential for varying the ablated feature size, selective material removal etc. A central processor controller controls the photo detector, driver of electro optic modulator, imaging system, XYZ stages and the galvanometer scanner as shown in FIG. 5.

Controlling the Laser Pulse by Acousto Optic Modulator

The acousto optic modulator may have the following specifications and may be used to control the laser pulse from the ultrafast laser oscillator to minimize or eliminate the cumulative heating effect and to improve the machining quality. These specifications include a rise time of 5-100 ns; efficiency of 70-95%, a clear aperture of 0.5-5 mm and a centre frequency/carrier frequency of 25 MHz to 300 MHz.

Figure 6:
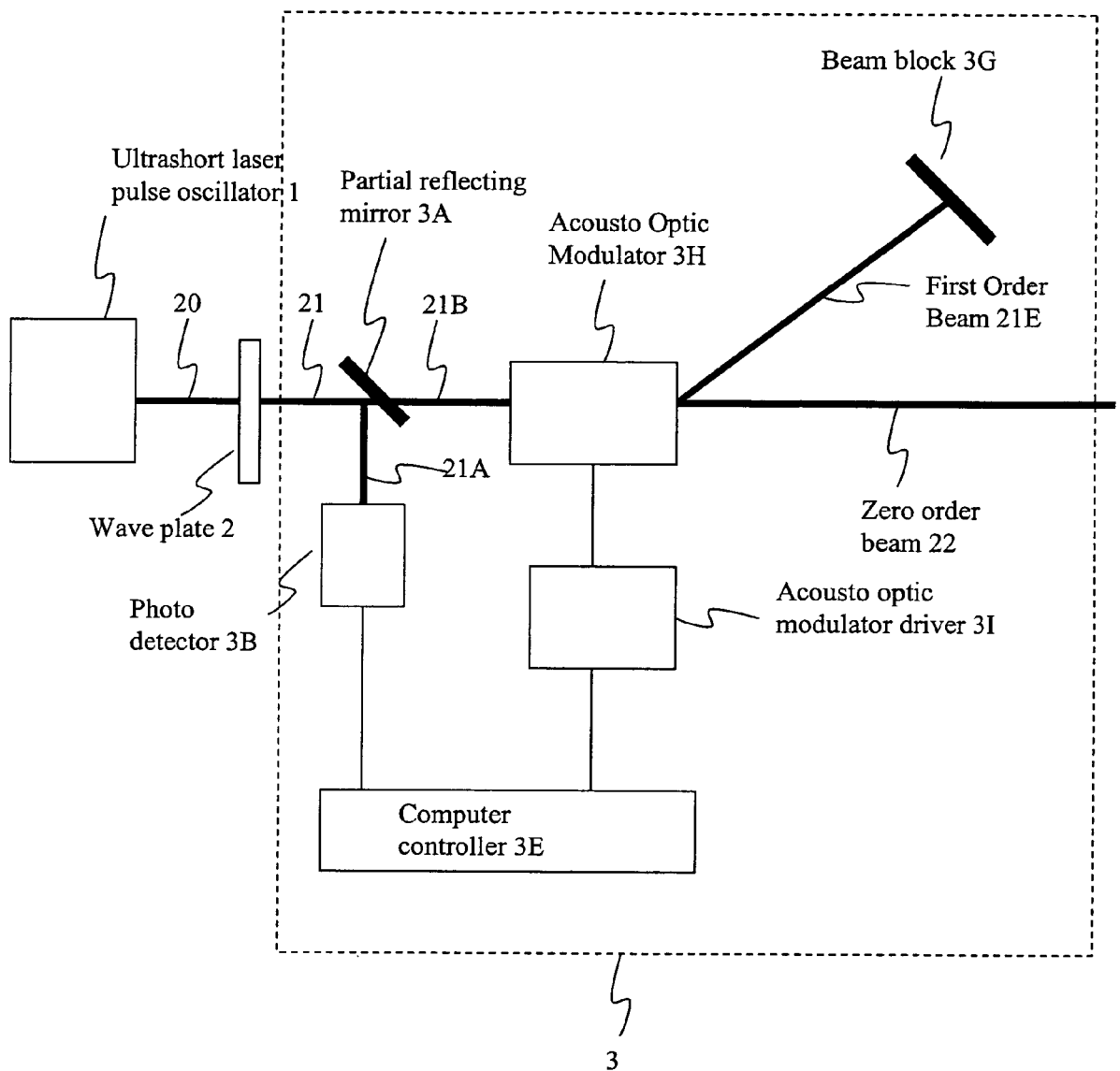
FIG. 6 is an illustration showing the apparatus to modulate the ultrafast laser pulse from the oscillator using acousto optic modulator.

The laser pulse from the ultrafast laser oscillator passes through the Acousto optic Modulator (AOM) 3H, which is driven by a driver 31 as shown in FIG. 6. The ultrafast laser is split in to first order beam 21E and zero order beams 22, where the first order beam 21E is deflected at an angle call Bragg angle to the zero order beam 22 as shown in FIG. 6. The zero order beam 22 will have the same polarization state of the input beam 21B and the first order beam will have a polarization state 90 degree to the input beam 21B. Thus if the input beam 21B is P polarized the zero order beam 22 will be P polarized and first order beam 21E will be S polarized and vice versa.

The bragg angle is given by the equation:

$$= \lambda f/v, \text{ where}$$

$\lambda$ is the wavelength of the incident laser beam, f is the centre frequency/carrier frequency of the AOM and v is the velocity of the acoustic wave propagation in the in the acoustic crystal.

The first order beam 21E or zero order beam 22 can be used for laser processing and the other beam is blocked by the beam blocker 3G.

Figure 7:
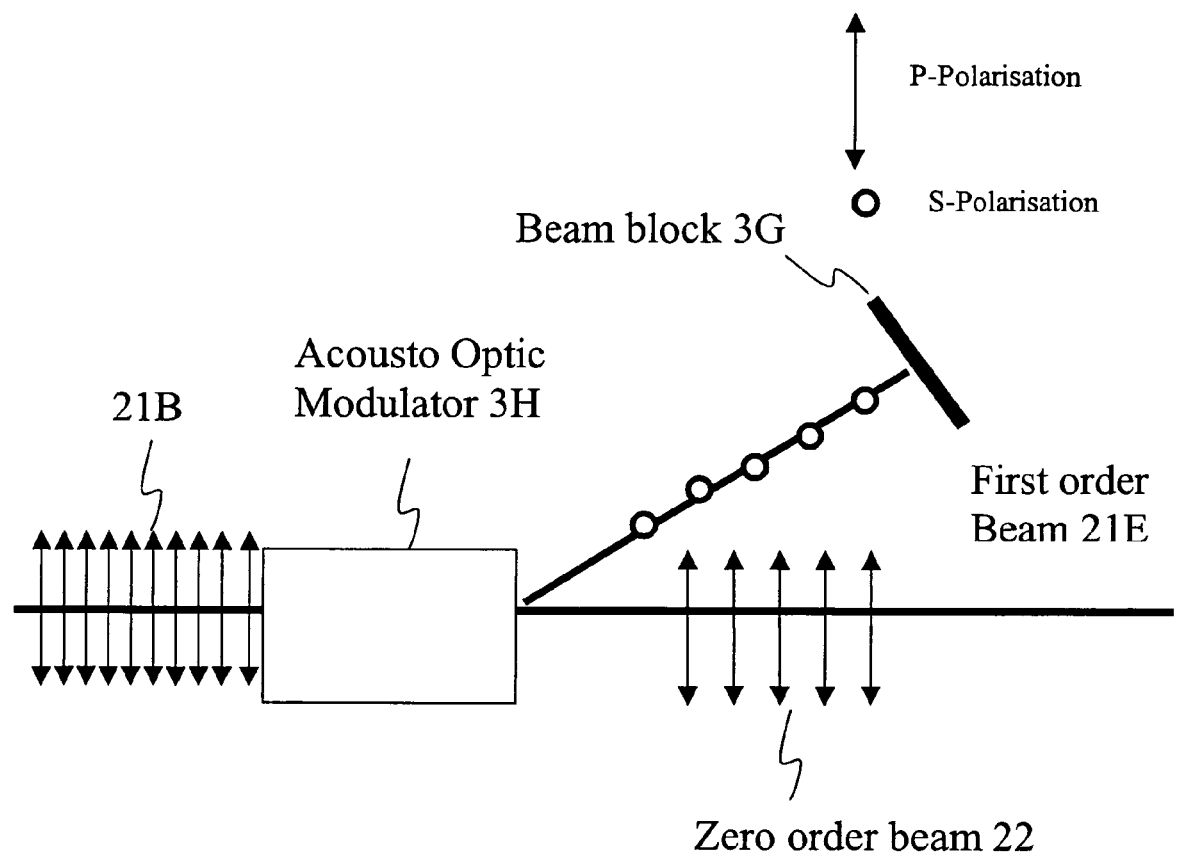
FIG. 7 is an illustration showing the mechanism of eliminating the successive ultrafast laser pulse to reduce the repetition rate by using acousto optic modulator.
Figure 8:
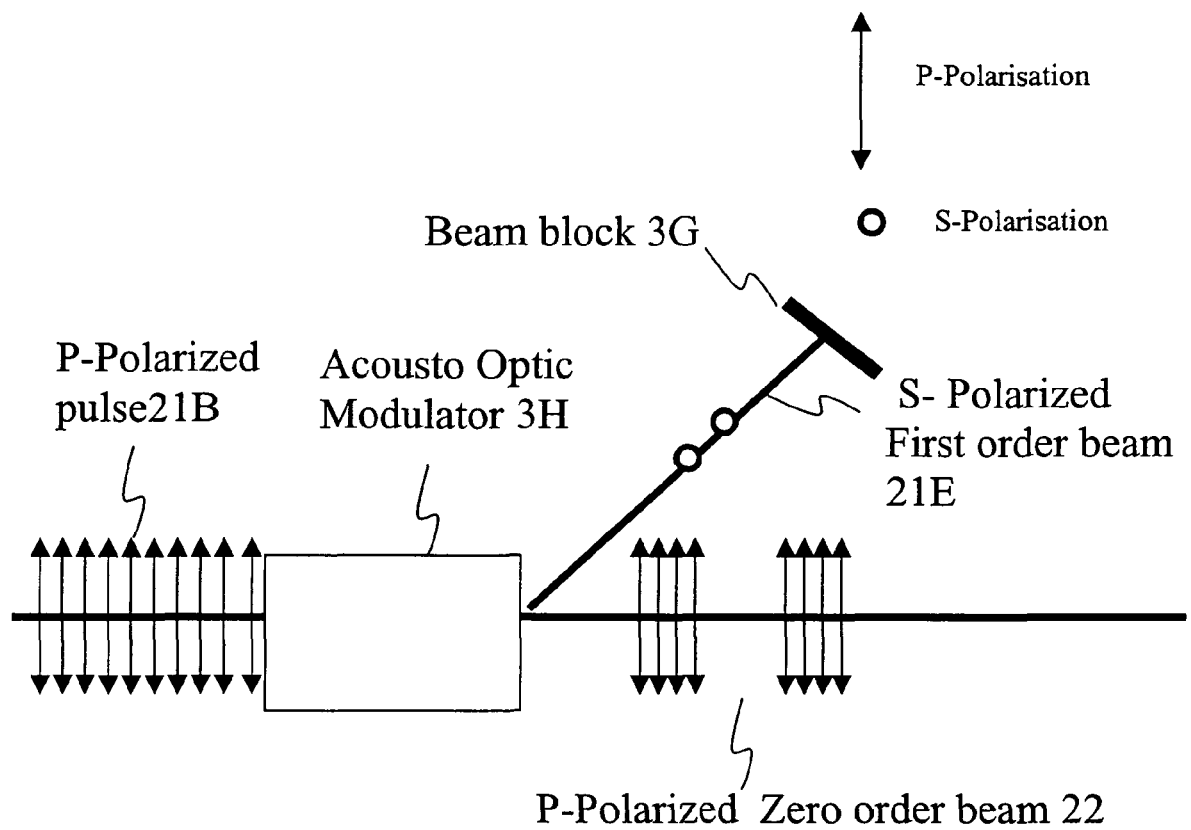
FIG. 8 is an illustration showing the introduction of a time gap between groups of laser pulse using acousto optic modulator.
Figure 9:
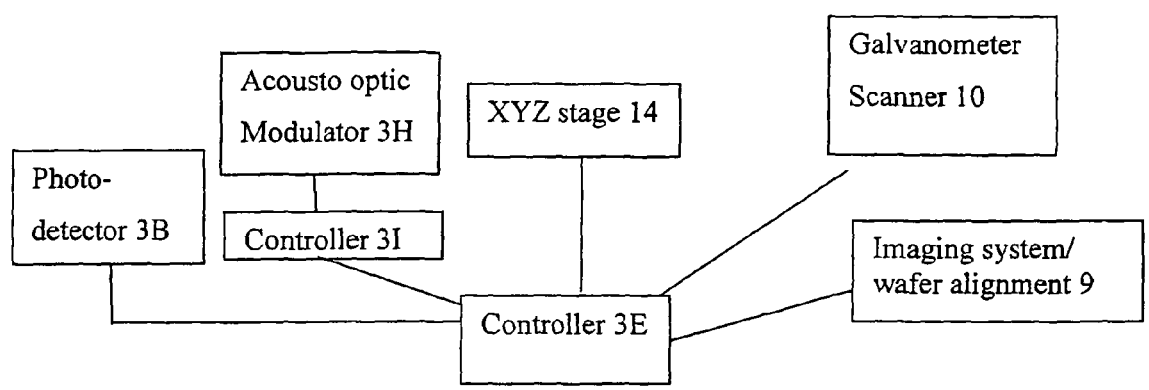
FIG. 9 is an illustration showing the control mechanism of photo detector, Acousto optic modulator, XYZ translation stage, galvanometer scanner and the imaging system by a processor control.

The ultrafast laser beam is a spectrum, and the spectral width increases with the reduction in pulse width. On passing through the AOM 3H different wavelength in the laser spectrum will have a different bragg angle. Hence the first order beam 21E will disperse resulting in an elliptical shape of the laser beam, which will result in a poor beam quality and hence the machined feature quality. The dispersion effect reduces with the increase in the pulse width due to shorter spectral width and vice versa. Using the first or zero order beams for material processing may not be a problem above 1 ps pulse with but below 1 ps pulse width there will be serious deterioration of the beam quality. The zero order beam 22 has no dispersive effect and can be used for processing and the first order beam 21E can be blocked by beam blocking means 3G as sown in FIG. 6. By using Acousto optic modulator for controlling the laser pulse from ultrafast laser oscillator the repletion rate of the laser pulse can be reduced as shown in FIG. 7 to minimize/eliminate the cumulative heating effect and improve the machining quality. Alternatively a time gap between groups of laser pulse can be provided to minimize the cumulative heating effect and improve the machining quality as sown in FIG. 8. Further the acousto optic modulator serves as a shutter to on and off the ultrafast laser pulse when required. Also the electro optic modulator can be used to vary the pulse energy by varying the power applied to the Acousto optic modulator from the driver. Precise control of pulse energy/intensity control is very essential for varying the ablated feature size, selective material removal etc. A central processor controller controls the photo detector, driver of Acousto optic modulator, imaging system, XYZ stages and the galvanometer scanner as shown in FIG. 9.

Polarization Conversion Module

Figure 10:
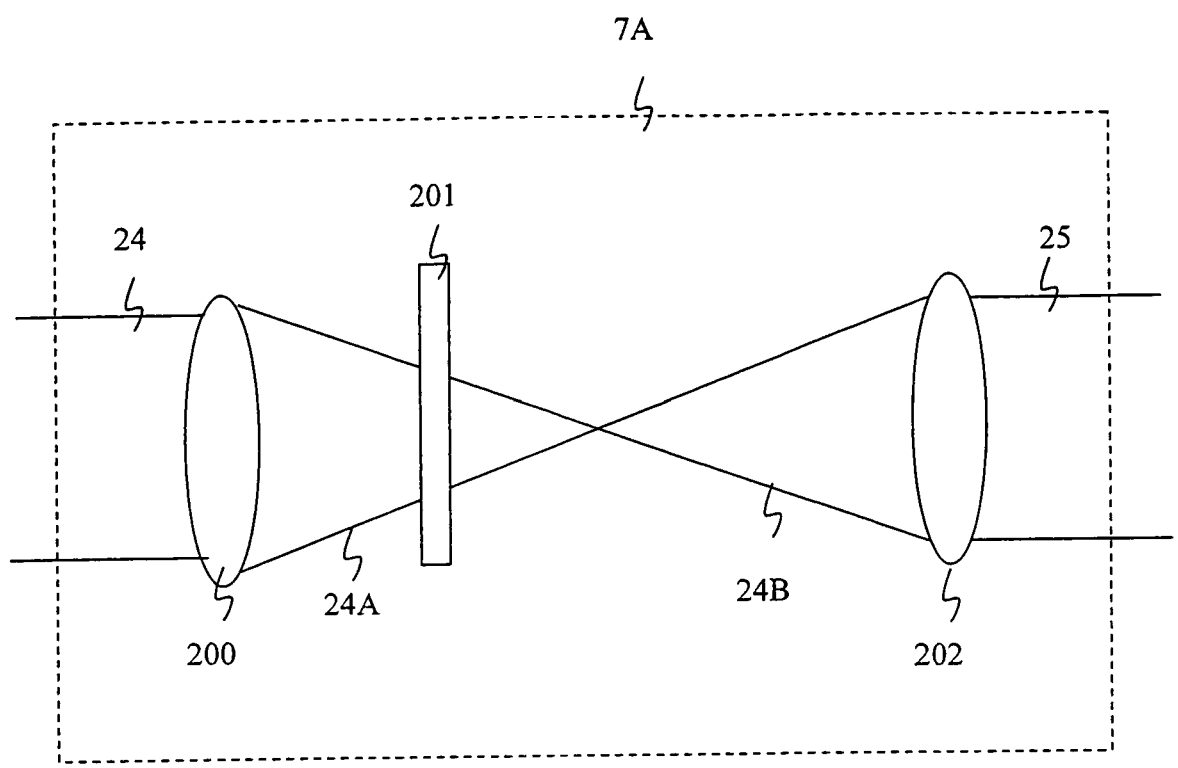
FIG. 10 is an illustration showing the apparatus of polarization conversion module to change the polarization state of the ultrafast laser beam.

The laser beam 24 is passed through a polarization conversion module 7A to change the polarization state of the laser beam along the axis of the laser beam profile. In FIG. 10 a novel yet simple technique is proposed for radial polarization modulation. The first biconvex lens 200 focuses the collimated laser beam into a tightly convergent beam 24A. As illustrated in FIG. 10, light rays of a convergent beam travel different optical path lengths when they transmit a birefringent/retardation plate plate 201. The retardation plate 201 can be a half-wave plate or a quarter-wave plate. The light rays at the central part of the beam travel shorter distance than those at the edge. Consequently, the polarization state is partially or completely modulated into radial, depending on the beam convergence and properties of the birefringent plate. The laser beam 24B is collimated by the lens 202. The lens 200 and 202 can be of the type positive or negative lens and may be combined like a telescope. It was found that the polarization converted beam by the polarization conversion module significantly improves the machining quality and throughput. By converting the polarization state of the beam by the polarization convertion module 7A there is a significant reduction in debris generated due to ablation. It also reduces the focused beam spot size by 10-30% compared to linear or circular polarization states. It increases the machining efficiency by 10-30% compared to linear or circular polarization states.

Scanning Module

The scanning module 10 can be a galvo scanner or a piezo scanner. The scanning module scans the laser beam in two axes. A piezo scanner is preferred over a galvo scanner due to several advantages. It has high scanning speed and hence improved machining quality and efficiency. There is high positioning accuracy and resolution. It minimizes cumulative heating effect due to high scanning speed. It has a common pivot point, and hence field distortion at the image plane is avoided, and it does not require compensation software to eliminate the distortion.

Beam Shaping Module

Figure 11:
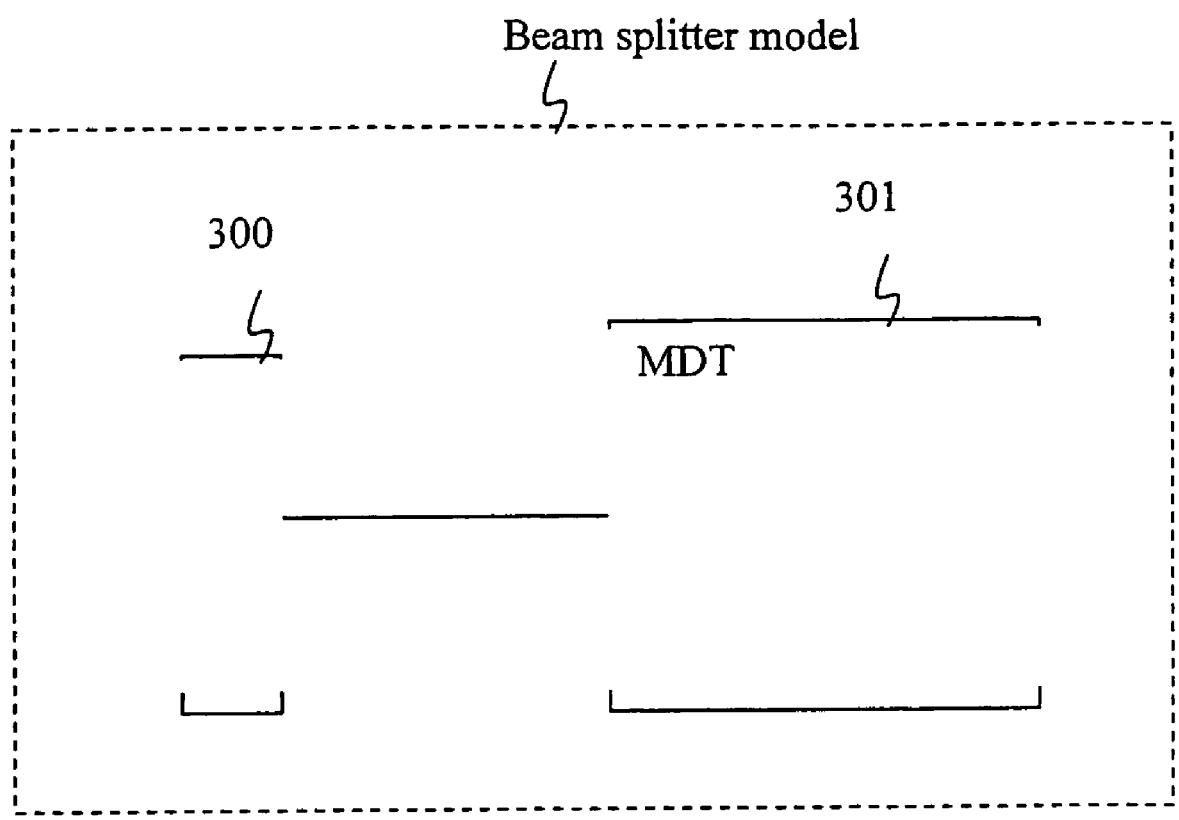
FIG. 11 is an illustration showing the apparatus of beam shaping module to change the profile of ultrafast laser beam.

The beam shaping module is introduced to change the profile of the laser beam to hat top or any other profile required. The beam shaping module is as shown in FIG. 11 consist of a quater wave plate 300 and a MDT crystal 301. MDT element is cheap compared to beam shapers, consisting of several micro lens or diffractive optics. The MDT element is based on the phenomenon of internal conical reflection and the resultant beam profile depends on the diameter and wavelength of the incoming beam and the length of the MDT element. By varying the diameter and length of the MDT element different beam prole can be obtained. The beam shaping module can be placed after the polarization conversion module or can be absent depending on the application.

Using Gas or Liquid Assist

Use of assisted gas or liquid plays a vital role in ultrafast laser machining. It provides a mechanical force to eject the melt from the cut zone and cools the cut zone by forced conversion.

By using assisted gas or liquid for ablating a feature using laser pulse from ultrafast laser oscillator, the heat diffusion time is reduced due to the cooling effect of gas or liquid. Due to the reduction in the heat diffusion time it is possible to minimize the cumulative heating effect and improve the ablated feature quality even at high repletion rate. Thus by using assisted gas or liquid the minimal/no cumulative heating effect and quality machined feature can be obtained at repetition rate 2-10 times higher than at non gas assisted process. Also the efficiency and overall quality of the machining process can be improved by using assisted gas or liquid due to the interaction of the gas or liquid jet with the work piece. Also the gas or liquid assist the machining process by efficiently carrying the debris from the cutting channel. These assisted gases or liquid are delivered by single or multiple nozzle 12 at a pressure, which is determined by the substrate material, depth of cut, the type of nozzle used, distance of the nozzle 12 from the work piece 12 etc. In case of assisted gas, compressed gas from a gas tank is fed into the nozzle through a gas inlet where a pressure gauge was set. The gas pressure can be adjusted through a regulator installed upstream of the gas inlet. In case of liquid assisted cutting water or any other appropriate liquid is mixed with compressed air and sprayed at on the substrate at required pressure. The liquid pressure and ratio of liquid to air is controlled by a regulator. Generally the gas or liquid nozzles are positioned close the work piece as possible for minimizing the gas or liquid usage and improving the machining quality and efficiency. Some example of the gas used minimize the cumulative heating effect, improving the ablated feature quality and improve the machining efficiency are air, HFC, $SF_6$, Nitrogen, Oxygen, argon, $CF_4$, Helium, or a chlorofluorocarbon or halocarbon gas. The commonly used liquid assists are water, methanol, iso-propanol alcohol etc. Lower the viscosity of the liquid better will be the cutting quality and efficiency.

Scanning the Beam at High Speed

By scanning the laser beam fast enough, so that each laser pulse irradiate at different spot. The scanning speed required to minimize the cumulative heating effect and increase the ablated feature quality depends on the focused spot size d, pulse energy $E_p$, scanning speed S, ablation threshold of material $E_{th}$ and repletion rate of the system R.

The distance between the two consecutive spot D is given by $$D=S/R$$

Figure 12:
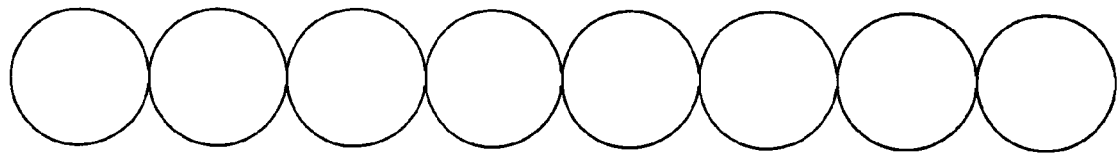
FIG. 12 is an illustration showing the 0% overlap between consecutive ablated laser spot.
Figure 12A:
FIG. 12A is an illustration showing the edge quality of the ablated feature with 0% overlap between consecutive ablated laser spot.
Figure 13:
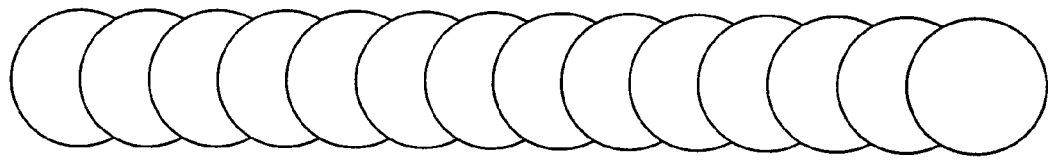
FIG. 13 is an illustration showing the 50% overlap between consecutive ablated laser spot.
Figure 13A:
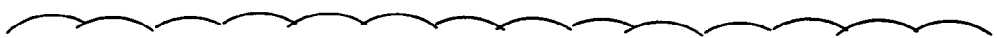
FIG. 13A is an illustration showing the edge quality of the ablated feature with 50% overlap between consecutive ablated laser spot.
Figure 14:
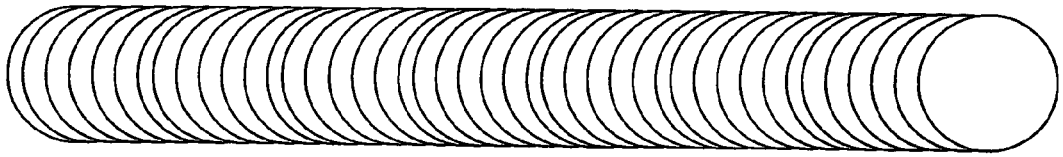
FIG. 14 is an illustration showing the edge quality of the ablated feature with 90% overlap between consecutive ablated laser spot.

For example if the repletion rate of the system is 1 MHz and the scanning speed of 1000 mm/sec, the distance between the consecutive pulses is 1 μm. The overlap between the pulses $O_p$ will determine the edge quality of the ablated feature. The ablated feature $F_d$ size can be as big as 2-3 times the focused spot size and as small as $1/20^{th}$ focused spot size depending on the laser fluence/pulse energy and the material threshold. So if the ablated feature size $F_d$ is 1 μm the consecutive pulse will have 0% overlap as sown in FIG. 12 hence there will be no cumulative heating effect present. But the edge quality will be bad if there is 0% overlap between the pulses as shown in FIG. 12A. Generally to obtain a uniform edge quality 50% or more over lap between the consecutive pulses is required. So in order to obtain 50% overlap as shown in FIG. 13, the scanning speed S should be reduced to 500 mm/sec. The resultant edge quality of the machined feature is as shown in FIG. 13A. The overlap between the pulses $O_p$ can be increased to 90% as sown in FIG. 14 by reducing the scanning speed to 100 mm/sec. The cumulative heating effect increases with the increase in the pulse to pulse overlap $O_p$, but an overlap of 90% to 50% generally has minimal cumulative heating effect and better machining quality for most of the application. Generally maximum scanning speed of a commercially available galvanometer scanner is 3000-7000 mm/sec. Since it is very difficult to reduce the repletion rate of the of the laser pulse from the ultrafast laser oscillator below a certain limit due to the required resonator length, the scanning speed of the laser beam plays a very important role in improving the machining quality and reducing the cumulative heating effect. The repetition rate of the system $R_o$ for a given pulse to pulse overlap $O_p$ is given by $$R_o=S/(1-O_p)X F_d$$

For example if the maximum scanning speed of the galvanometer scanner is 5000 mm/sec and ablated feature size is 1 μm the repletion rate of the pulse from ultrafast laser oscillator R can be as high as 50 Mhz for a pulse to pulse overlap $O_p$ of 90%. But if the maximum scanning speed of the galvonometer scanner is 1000 mm/sec then for same condition of 90% overlap the repletion rate R can be only 10 MHz. Thus the cumulative heating effect and the ablated feature quality can be controlled by varying the scanning speed for a given repletion rate of the system, the pulse to pulse overlap and ablated feature size.

Depending on the depth of the feature required the laser beam will be scanned along the same path few times at the optimal scanning speed. This mechanism of scanning at high speed is applicable for cutting a slot or via drilling by trepanning.

Pulse Energy

Pulse energy plays a vital role in micro and nano processing with high quality.

Pulse energy is given by $P_e=P_{avg}/R$, where $P_{avg}$ is the average power of the laser and R is the repletion rate.

The pulse energy required to ablate a feature depends mainly on the threshold fluence of the material, feature size, maximum depth of the feature required.

Maximum Depth

The maximum depth that can be generated for a given focused spot size of the laser beam depends on the pulse energy. As the ablated feature becomes deeper it is difficult to remove the ablated material from the hole and hence the ablated material absorbs the energy of the subsequent pulse. Thus the Depth limit exhibits a logarithmic dependence on the pulse energy.

Feature Size Repeatability

The uncertainty in the feature size obtained will depend on the number of pulse required to ablate the required feature. Due to the topography generated and debris deposited in the crater by the ablation of the first pulse the absorption of the successive pulse is different due to the defects generated in the previous pulse, scattering of the laser beam etc. Due to the above mechanism the ablation threshold of the successive pulse may be vary. The uncertainty in the diameter of ablated feature increases with the increase in the number of laser pulse. More the number of pulse required for a given feature greater will be the uncertainty of feature size and hence the repeatability. Hence it is advantageous to higher pulse energy and lower number of pulse to ablate a required feature. An optimal pulse energy and number of pulse should be determined to ablate a feature of required specification.

Quality of the Ablated Feature

Due to the change in the topography of the substrate and the debris deposited in the crater by the initial pulse the successive pulse will scatter and hence there is a change in the threshold fluence of the successive pulse. Higher pulse energy generates sufficient pressure for ejecting the debris out of the carter and hence the successive pulse can interact with the fresh substrate. This results in improved top surface and inner wall quality of the ablated feature.

Wavelength of the Laser Beam

In ultrafast laser processing the wavelength of the laser beam does not have a major impact on the threshold fluence of the material as in case of short pulse ablation in micron and nanosecond pulse width. Due to high peak power of the laser due to short pulse width, the protons are generated by the laser beam to start the ablation process rather than generated from the substrate. Hence absorption of the material at different wavelength does not have a major influence in its threshold fluence. Hence laser beam having the fundamental frequency having the wavelength preferably in the range of 700 nm to 1200 nm, will have higher cutting efficiency than the second harmonic frequency (frequency doubled) of 350 nm-600 nm for a given focused spot size due to the higher average power from the ultrafast laser oscillator at fundamental frequency. Fundamental laser frequency power will be 50% to 300% higher than the second harmonic frequency in the range of 233 nm to 400 nm and hence will have 50% to 300% higher material removal throughput.

Similarly, the laser beam having the second harmonic frequency having the wavelength preferably in the range of 350 nm to 600 nm, will have higher cutting efficiency compared to third harmonic frequency (Frequency tripled) due to the greater average power from the ultrafast laser oscillator at second harmonic frequency. Second harmonic laser frequency power will be 50% to 300% higher than the third harmonic frequency in the range of 233 nm to 400 nm and hence will have 50% to 300% higher material removal throughput.

Figure 15:
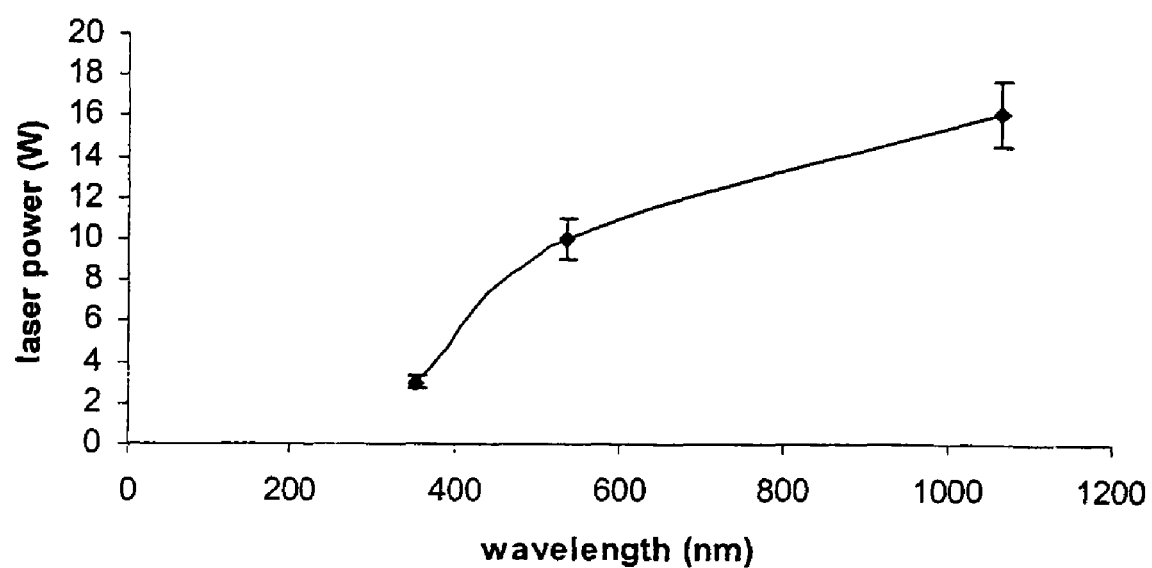
FIG. 15 is a graph showing the average laser power at different laser wavelength for a typical picosecond laser oscillator.

For example the average power out put at fundamental wave length at 1064 nm is 16W for a picosecond laser model UPL-20-Lumera laser, the average power of second harmonic frequency at 532 nm wavelength is 10W (FCS-532-Lumeral laser) and the third harmonic frequency at 355 nm wavelength is 3W (FCS-355-Lumera laser). Typical increase in laser power with the laser wavelength for ultrafast laser oscillator of picosecond pulse width is as shown in FIG. 15.

The stability of the laser beam will deteriorate with the reduction in wave length by frequency doubling and tripling, due to increase in the optical components and the sensitivity of the frequency doubling and tripling crystal to environmental factors such as temperature. This deterioration in the stability of the laser beam will lead to poor pulse to pulse energy stability and beam pointing stability. Hence repeatability in feature size and position accuracy may deteriorate compared to the fundamental frequency from the ultrafast laser oscillator by frequency doubling and tripling.

Hence the fundamental frequency will have better stability in terms of pulse to pulse energy and pointing stability compared to second harmonic frequency. Similarly the second harmonic frequency will have better stability in terms of pulse to pulse energy and pointing stability compared to third harmonic frequency. Also the cost of the system may increase by frequency doubling and tripling due to addition of more optical components.

In spite of the drawbacks of using frequency doubled and tripled laser pulse, some applications may demand the use of shorter wavelength to achieve smaller feature size and in sensitive material processing.

Dicing of Thin Wafer

In addition the method and apparatus of the present invention can be utilized for dicing/singulation of thin semiconductor wafers less than 150 micron thickness and to ameliorate the aforesaid deficiencies of the prior art by using ultrafast pulse generated directly from the laser oscillator.

Figure 16:
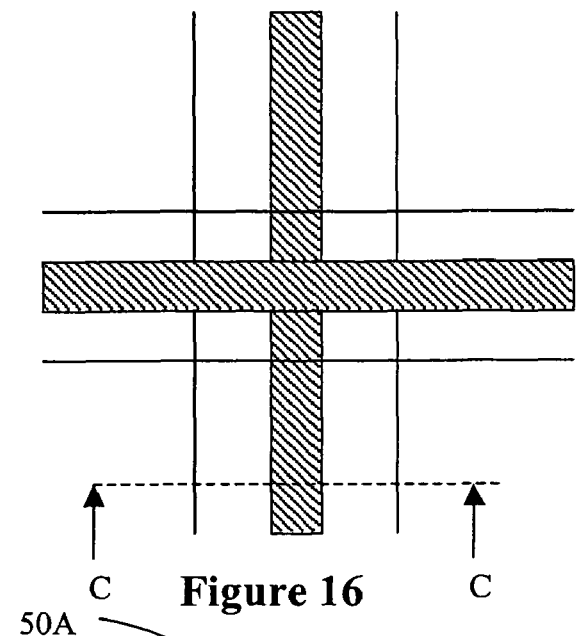
FIG. 16 is an illustration of laser diced channel in the dicing/singulation lane in a thin semiconductor wafer using laser from ultrafast laser oscillator.
Figure 16:
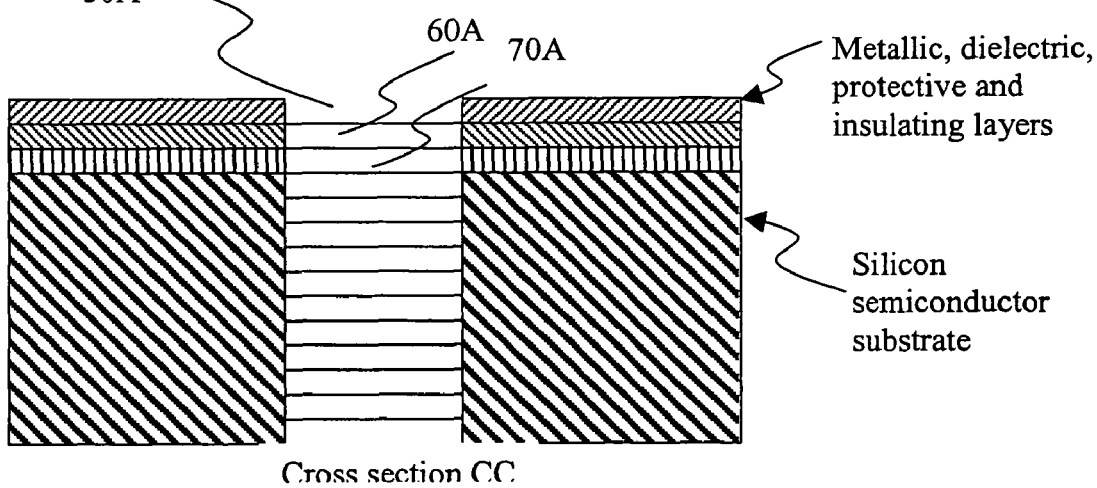
Figure 16:
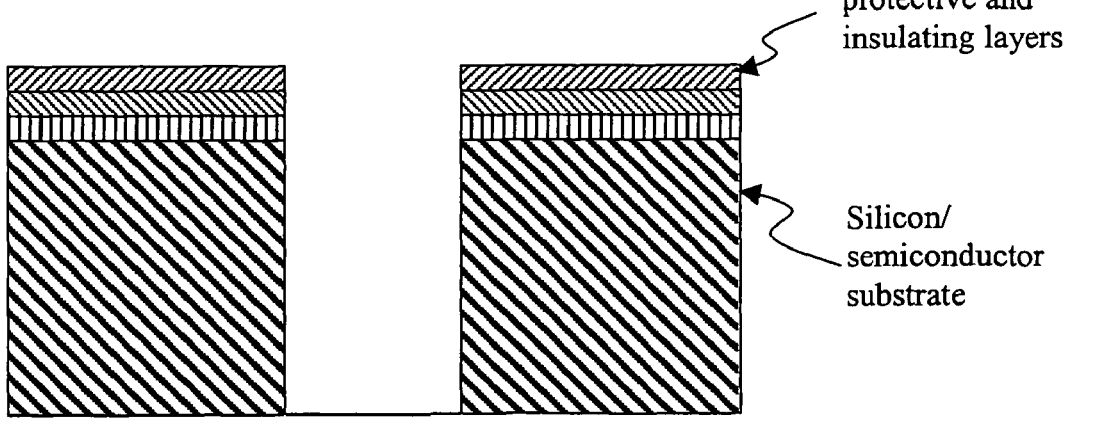

The thin silicon wafer is diced along the dicing lane by forming a through channel using ultrafast laser pulse from the oscillator as shown in FIG. 16. During each scanning cycle, a small quantity of substrate material is removed along dicing/singulation lane 50(a), followed by 60(a), followed by 70(a) and so on, forming a shallow channel along the dicing/singulation lane as shown in FIG. 16A. The n cycle of repeated scan is required along the dicing/singulation lane to dice or singulate the entire wafer thickness as shown in FIG. 16B. The thickness of material removed in each cycle can be in the range of few microns to few nanometers and the entire cut will be performed by multiple cycles. The number of cycle of repeated scanning may be required depending on the thickness of the semiconductor wafer. The cross-section of the completely ultrafast laser diced semiconductor wafer is as shown in FIG. 16B. The semiconductor wafer may be held on a tape frame via an adhesive tape to ease the handling of the semiconductor wafer and the removal of singulated dies after complete singulation/dicing by ultrafast laser pulse from oscillator.

By using the method and apparatus of the present invention, there are several advantages compared to saw and long pulse laser dicing. There is a higher dicing speed, because of high repletion rate and high peak power of the laser pulse. It is completely chip-free and crack-free due to absence of heat affected zone. It is a clean dry process since there is no molten material phase during the dicing process. There are no undesirable changes in electrical or physical characteristics of the material surrounding the target material. There is no recast layer present along the laser cut sidewalls. The surface debris present does not bond with the substrate and it is easily removed by conventional washing techniques. A very small kerf width can be achieved, since the feature size is not limited to wavelength and hence increases the dies per wafer. This is a minimal or no heat affected zone, and hence there is minimal/no change in the property of the materials in the vicinity of the machined surface resulting in greater material strength/die strength. The recast layer along the side walls of the cut surface is minimized or eliminated. The effect of cumulative heating, which may cause damage to the adjacent circuits, is minimized or eliminated. There is higher die strength due to minimal heat affected zone, cracks, debris etc.

Dicing of Low-K Dielectric Semiconductor Wafer

In addition the method and apparatus of the present invention can be utilized for dicing of Low-K dielectric semiconductor wafer and to ameliorate the aforesaid deficiencies of the prior art by using ultrafast laser pulse.

There are also several advantage of using ultrafast laser pulse directly for dicing of Low-K dielectric semiconductor wafer. It is a single-step process, for dicing through the low-k dielectric layer and the silicon substrate. There is no realignment. There is minimal or no delamination of Low-K dielectric and metal layer. There is a higher dicing speed because of high peak power of the pulse. It is completely chip-free and crack-free due to the absence of a heat affected zone. It is a clean dry process, since there is no molten material phase during the dicing process. There are no undesirable changes in electrical or physical characteristics of the material surrounding the target material. No recast layer is present along the laser cut sidewalls. The surface debris present does not bond with the substrate and it is easily removed by conventional washing techniques. A very small kerf width can be achieved, since the feature size is not limited to wavelength and hence increases the dies per wafer. There is minimal or no heat affected zone, and hence there is minimal/no change in the property of the materials in the vicinity of the machined surface resulting in greater material strength/die strength. The recast layer along the side walls of the cut surface is minimized or eliminated. The effect of cumulative heating, which may cause damage to the adjacent circuits, is minimized or eliminated. There is higher die strength due to minimal heat affected zone, cracks, debris etc.

The invention has been described with reference to exemplary embodiments. However, it will be readily apparent to those skilled in the art that it is possible to embody the invention in specific forms other than those of the embodiments described above. This may be done without departing from the sprit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A laser machining system for dicing thin and ultra-thin semiconductor wafers having regular or irregular chip patterns using an ultrafast laser pulse from an ultrafast laser oscillator, comprising:
    an emitter that emits a pulsed laser beam of ultrashort pulse width from the ultrafast laser oscillator without amplification in addition to an amplification provided by the ultrafast laser oscillator;
    a laser pulse modulator that modulates a laser pulse of the pulsed laser beam, to minimize a cumulative heating effect and to improve a machining quality of the wafers;
    a beam diameter modulator that varies the diameter of the pulsed laser beam;
    a scanner that scans the pulsed laser beam across the wafer; and
    a focuser that focuses the pulsed laser beam onto the wafer, wherein the thin and ultra-thin semiconductor wafers each includes a plurality of areas demarcated by streets, and wherein each of the thin and ultra-thin semiconductor wafers is diced along the streets to convert each of the thin and ultra-thin semiconductor wafers into a plurality of areas corresponding to semiconductor chips.

2. A system according to claim 1, which further includes a converter that converts the polarization of the laser beam, which comprises a polarization plate disposed between a telescopic module or any converging or diverging module to change the polarization state of the laser beam along the axis of the beam,
    wherein the laser beam at the central part travels shorter distance in the polarization plate than those at the edge due to the divergence or convergence of the laser beam,
    wherein the polarization state of the laser beam is different, along the axis, at different portions of the laser beam profile due to a different distance traveled through the polarization plate,
    wherein the telescopic module is selected from the group comprising a keplerian telescope having two positive lenses or a Galilean telescope having positive and negative lenses,
    wherein the polarization plate is selected from a group comprising a half wave plate, a quarter wave plate, a retardation plate, a birefrengent plate or a combination of a half wave and quarter wave plate, and
    wherein the polarization state of the resultant laser beam from the polarization is at least partially radially or azimuthally polarized.

3. The method of claim 1, wherein a resultant polarization state of the laser beam from a converter that converts the polarization of the pulsed laser beam results in a reduction in a focused machined feature size and spot size of the pulsed laser beam compared to a linear or circularly polarized laser beam by 5-40%,
    wherein debris surrounding an ablated area is minimized compared to linear or circularly polarized laser beam, and
    wherein a machining efficiency or ablation rate is increased by 10-100% compared to linear or circularly polarized laser beam.

4. The system of claim 1, wherein the laser pulse modulator modulates the pulsed laser beam from an ultrafast laser source includes a repletion rate ranging from 10 KHz to 400 MHz provided by an electro optic modulator or an acousto optic modulator, in order to minimize the cumulative heating effect and to improve an ablated feature quality.

5. The system of claim 4, wherein the electro optic modulator and acousto optic modulator serve as a laser shutter to turn on and off the laser pulse from the ultrafast laser oscillator when required.

6. The system of claim 4, wherein a photo detector is placed before the electro optic modulator or acousto optic modulator to obtain a signal and to synchronize an on/off signal to the electro optic modulator and to avoid clipping of the laser pulse.

7. The system of claim 4, wherein the repletion rate of the laser pulse from ultrafast laser oscillator is reduced by modulating the laser pulse by the electro optic modulator or the acousto optic modulator to minimize or eliminate the cumulative heating effect and improve the machining quality.

8. The system of claim 4, wherein a time gap is provided between groups of laser pulses from the ultrafast laser oscillator by modulating the laser pulse with the electro optic modulator or the acousto optic modulator to minimize the cumulative heating effect and improve the machining quality.

9. The system of claim 4, wherein the laser pulse from the ultrafast laser oscillator is modulated by the electro optic modulator or the acousto optic modulator, such that the laser pulse is transmitted or blocked when required.

10. The system of claim 4, wherein the pulse energy of the laser beam from the ultrafast laser oscillator is controlled by varying power applied to the electro optic modulator or the acousto optic modulator from an electro optic driver or an acousto optic driver, respectively.

11. The system of claim 4,
wherein the electro optic modulator is used in combination with a polarizing beam splitter, a polarizer or a prism in order to modulate the laser pulse,
wherein the electro optic modulator preferably includes a pockels cell, a Q-switch or a pulse picker,
wherein the electro optic modulator includes a short rise time in the range of 20 ns to 10 ps, an energy/power loss less than 10% and a clear aperture diameter of 1-10 mm,
wherein an antireflection coating and type of crystal in the electro optic modulator depends on a laser wavelength, pulse width and energy,
wherein the electro optic modulator is driven by a driver which can be computer controlled, and
wherein the electro optic modulator is driven by the driver and by sending a trigger signal, which is preferably a power or voltage signal, which shifts a polarization state of the laser beam on passing through the electro optic modulator from a horizontal to a vertical polarization or vice versa.

12. The system of claim 11,
wherein changing a polarization of the pulse in the electro optic modulator will be transmitted or deflected by the polarizing beam splitter or polarizer or prism, which acts like a high speed shutter and modulates the laser pulse from the ultrafast laser oscillator,
wherein the transmitted beam is used for ultrafast pulsed laser processing and the deflected beam is blocked by a beam blocker and vice versa.

13. The system of claim 11, wherein the electro optic modulator changes the polarization state of any individual pulse or a group of pulses from the ultrafast laser oscillator by 90 degrees to a horizontal or a vertical polarization state depending on the polarization state of the input pulse.

14. The method of claim 4, wherein the acoustic optic modulator includes a rise time of 5-100 ns; an efficiency of 50-95%, a clear aperture of 0.5-5 mm; and a centre frequency/carrier frequency of 25 MHz to 300 MHz.

15. The system of claim 4 for dicing of thin and ultra thin semiconductor wafer;
wherein the acousto optic modulator is driven by a driver and a trigger signal, which is preferably a power or voltage signal,
wherein the acousto optic modulator splits the ultrafast laser beam in to first order and zero order beams, where the first order beam is deflected at an angle call Bragg angle to the zero order beam;
wherein the zero order beam will have the same polarization state of the input beam and the first order beam will have a polarization state 90 degree to the input beam;
wherein the first order or zero order beam can be used for laser processing and the other beam is blocked by a beam blocking means and thus acting like a high speed shutter and modulating the laser pulse from ultrafast laser oscillator.

16. The system of claim 15, wherein the zero order beam, which has no dispersive effect, is used for material processing, and the first order beam is blocked by a beam blocking means.

17. The system of claim 1, for dicing of thin and ultra thin semiconductor wafer;
wherein the ultrafast laser beam is expanded or reduced in beam diameter in one or two axes of the laser beam by a beam expansion or reducing means, selected from the group comprising the keplerian telescope type, having two positive lenses, or of the Galilean telescope type, having a positive and a negative lens;
wherein the expansion or reduction ratio of the Keplerian or Galilean telescope is chosen depending on the focused spot size and focal depth of the focused laser beam required at the semiconductor wafer substrate.

18. The system of claim 1, which further includes a polarization plate that increases the cutting efficiency and reduces the kerf width on both X and Y cutting axes.

19. The system of claim 1, which further includes a beam quality improving means having a diaphragm of the type iris diaphragm.

20. The system of claim 1, wherein further includes a one axis or two axis galvanometer scanner or a piezo scanner means for scanning the laser beam across the wafer.

21. The system of claim 20, wherein piezo scanner minimizes the cumulative heating effect due to high scanning speed, and has common pivot points that avoids pillow shaped field distortion at the image.

22. The system of claim 1, for dicing of thin and ultra thin semiconductor wafers;
wherein the pulsed laser beam is focused on the substrate by means for focusing which includes a lens selected from the group comprising an objective lens, a telecentric lens, a f-Theta lens, or a confocal microscopy lens;
wherein the means for focusing is positioned at a distance from the scanning mirror approximately equal to the front focal length (forward working distance) of the focusing means and the work piece is positioned at approximately the back focal length (back working distance) of the focusing means;
wherein the focal length of the focusing lens is chosen such that the spot size and focal depth of the focused beam remains within the specified percentage on the optimal focused spot size and focal depth depending on the semiconductor wafer thickness.

23. The system of claim 1, wherein wafer is moved with respect to the laser beam by a translation table means.

24. The system of claim 23, wherein the pulse modulating means, scanning means and the translation table means are controlled by central processor control means.

25. The system of claim 1, further comprises scanning strategy control means for controlling at least one of the incident laser beam power, pulse repetition rate, duration between successive pulse or a group of pulse and scanning speeds during the machining of the wafer.

26. The system of claim 1, further includes a gas or liquid assist means which facilitates blowing potential backfill debris generated by the preceding laser pulse from the cut zone, and exposing fresh uncut substrate to the succeeding laser pulse.

27. The system of claim 26, wherein the gas is applied at a pressure through a nozzle; or wherein the liquid is mixed with compressed air and applied at a pressure through at least one nozzle; and
wherein the gas assist is selected from a group comprising air, HFC, $SF_6$, nitrogen, oxygen, argon, $CF_4$, helium, or a chlorofluorocarbon or halocarbon gas; and
wherein the liquid assist may be selected from a group comprising water, methanol, or iso-propanol alcohol.

28. The system of claim 1, for dicing of thin and ultra thin semiconductor wafer further comprising an imaging means to align the work piece to the focused laser beam and to monitor the machining process.

29. The system of claim 1, for dicing of thin and ultra thin semiconductor wafer further comprising a beam shaping means to change the shape of the beam profile at the focused spot size;
- wherein the beam shaping means is of the type having a monoclinic double tungstate (MDT) element based on the phenomenon of internal conical reflection;
- wherein the beam shaping is obtained by the combination of a quarter wave plate and the MDT element; wherein the resultant beam profile depends on the diameter and wavelength on the incoming laser beam and the length of the MDT element;
- wherein a flat top beam profile can be generated at the focal plane;
- wherein the efficiency of beam shaping is relatively high due to the transitive efficiency of the MDT material and minimal optical elements involved; and
- wherein the machining efficiency and quality of machining are improved due to beam shaping.

30. The system of claim 1, wherein the semiconductor wafer includes monocrystalline silicon or polycrystalline silicon, metallic material, insulating material, dielectric material, glass material or silica, semiconductor material, polymer, ceramic material, low-K dielectric material, Galium Arsenide, indium phosphide, silicon carbide, silicon nitride or a combination of the above.

31. The system of claim 1 further includes controlling the scanning speed of laser beam from the ultrafast laser oscillator for a pulse repetition rate 1 MHZ to 400 MHZ;
- wherein the optimal scanning speed to minimize the cumulative heating effect, improve the cutting efficiency and improve the machining quality depends on the repletion rate of the laser beam, the ablated feature size and the type of gas or liquid assist used.

32. The system of claim 1 further comprises means for controlling the pulse energy and number of pulse required to ablate the required feature by laser pulse from ultrafast laser oscillator for a pulse repetition rate 1 MHZ to 400 MHZ;
- wherein a higher pulse energy and lower number of pulses at each scan point improves the repeatability of feature size and machining quality.

33. The system of claim 1 for dicing of thin and ultra thin semiconductor wafer further includes a pulsed laser beam from the ultrafast laser oscillator having a fundamental frequency having a wavelength in the range of 700 nm to 1200 nm, and further having a 50% to 200% higher cutting efficiency than the second harmonic frequency of 350 nm-600 nm from the ultrafast laser oscillator due to the higher laser power;
- wherein the pulsed laser second harmonic frequency from the ultrafast laser oscillator having the wavelength in the range of 350 nm to 600 nm, having 50% to 200% higher cutting efficiency compared to a third harmonic frequency from the ultrafast laser oscillator of 233 nm-400 nm due to the first laser power.

34. The system of claim 33;
- wherein the fundamental frequency from the ultrafast laser oscillator has a better laser stability position accuracy and feature size repeatability than the second harmonic frequency from the ultrafast laser oscillator due to the increased optical components and sensitivity of the frequency conversion crystal;
- wherein the second harmonic frequency from the ultrafast laser oscillator has better laser stability, position accuracy and feature size repeatability than the third harmonic frequency from the ultrafast laser oscillator due to increased optical components and sensitivity of the frequency conversion crystals.

35. The system of claim 1, for dicing of thin and ultra thin semiconductor wafer,
- wherein the laser pulse from the ultrafast laser oscillator is modulated by an acousto optic modulator or an electro optic modulator,
- wherein the laser beam is focused by a focusing unit and scanned across a work piece surface,
- wherein a semiconductor wafer is diced by the ultrafast laser pulse from the ultrafast laser oscillator in a number of cycles,
- wherein the semiconductor wafer is diced by removing material in a few cycles, and
- wherein a focused laser spot is radially or azimuthally focused depending on the machining efficiency,
- wherein a thickness of material removed in each cycle is in a range of a few microns to a few nanometers and an entire cut is performed by multiple cycles, and
- wherein a number of cycles of repeated scanning is required depending on the thickness of the semiconductor wafer.

36. The system of claim 1, for dicing of thin and ultra thin semiconductor wafer wherein the semiconductor wafer includes multiple layers of dielectric or insulating or metallic or polymer or silicon or a combination of above; and
- wherein the semiconductor wafer is held on a tape frame via an adhesive tape.

37. The system of claim 1, wherein the cumulative heating effect is minimized and machining quality is improved by at least one of controlling a time duration between pulses with an acousto optic modulator or an electro optic modulator, by controlling a scanning speed of the laser beam, by controlling a pulse energy and a pulse number at each scan point, by using gas or liquid assist, and or using laser pulses having an increasing wavelength.

38. The system of claim 1, for dicing of thin and ultra thin semiconductor wafer further comprises means of aligning the semiconductor wafer and means for detecting the cutting lines of the semiconductor wafer.

39. The system of claim 1, further comprises an auto focusing means for focusing the ultrafast laser beam automatically at the semiconductor wafer surface.

40. The system of claim 1, further comprises means for producing die having rounded corners by scanning the laser beam along a curved trajectory at the corner of the die using a galvanometer based scanner to increase the die strength.

41. The system of claim 1, for dicing of thin and ultra thin semiconductor wafer wherein the semiconductor wafer includes a low-K dielectric material.

42. The system of claim 1, wherein the dicing speed or cutting efficiency is increased due to a high repletion rate and high peak power of the ultrafast laser pulse from the ultrafast laser oscillator.

43. The system of claim 1, wherein there is minimal or no chipping, delamination, and cracking along and near the dicing lane due to the short pulse width of the ultrafast laser beam.

44. The system of claim 1, for dicing of thin and ultra thin semiconductor wafer;
- wherein there is no discoloration near the cut zone due to minimal heat affected zone; and wherein there is no undesirable changes in electrical or physical characteristic of the material surrounding the target material.

45. The system of claim 1, for dicing of thin and ultra thin semiconductor wafer;
   wherein the kerf width is reduced and hence increases the number of dies per wafer; and
   wherein the number of device per wafer can be increased and hence the overall reduction in the cost of manufacturing of the devices.

46. The system of claim 1, for dicing of thin and ultra thin semiconductor wafer;
   wherein the die strength is relatively high due to the minimal or absence of chipping, cracking and heat affected zone due to short pulse width of the laser beam; and
   wherein the die strength is relatively high due to smooth side wall along the cut surface and minimal molten material near the vicinity of cut zone.

47. The system of claim 1, wherein the debris is loosely bound to the surface and can be removed while machining using a pressurized gas assist and hence the dicing process is water free.

48. The system of claim 1, for dicing of thin and ultra thin semiconductor wafer;
   wherein there is minimal or no recast layer along the side wall and near the cut zone and hence failure of the device is minimized;
   wherein the cumulative effect is minimized or eliminated and hence there is minimized the damage to the adjacent circuits and devices.

49. The system of claim 1, for dicing of thin and ultra thin semiconductor wafer;
   wherein the ultrafast laser oscillator can be a fiber oscillator amplifier having a repetition rate greater than 1 MHZ.

* * * * *